United States Patent
Bakhishev et al.

(10) Patent No.: US 10,156,852 B2
(45) Date of Patent: Dec. 18, 2018

(54) SYSTEMS AND METHODS FOR USING RADIO FREQUENCY SIGNALS AND SENSORS TO MONITOR ENVIRONMENTS

(71) Applicant: Locix Inc., San Bruno, CA (US)

(72) Inventors: Teymur Bakhishev, San Jose, CA (US); Vivek Subramanian, Orinda, CA (US); Vikram Pavate, Foster City, CA (US); Tommi Ylamurto, Los Gatos, CA (US)

(73) Assignee: Locix, Inc., San Bruno, CA (US)

( * ) Notice: Subject to any disclaimer, the term of this patent is extended or adjusted under 35 U.S.C. 154(b) by 0 days.

(21) Appl. No.: 14/988,617

(22) Filed: Jan. 5, 2016

(65) Prior Publication Data
US 2017/0192435 A1    Jul. 6, 2017

(51) Int. Cl.
*H04W 4/70* (2018.01)
*G05D 1/02* (2006.01)
*H04W 4/04* (2009.01)
*H04W 24/08* (2009.01)
*H04W 24/10* (2009.01)
*H04W 84/22* (2009.01)

(52) U.S. Cl.
CPC ......... *G05D 1/0246* (2013.01); *G05D 1/0214* (2013.01); *H04W 4/043* (2013.01); *H04W 4/70* (2018.02); *H04W 24/08* (2013.01); *G05D 2201/0203* (2013.01); *G05D 2201/0207* (2013.01); *G05D 2201/0209* (2013.01); *H04W 24/10* (2013.01); *H04W 84/22* (2013.01); *Y10S 901/01* (2013.01); *Y10S 901/47* (2013.01)

(58) Field of Classification Search
CPC ..... H04W 4/005; H04W 4/043; H04W 24/10; H04W 84/12
USPC ....................................... 455/41.2
See application file for complete search history.

(56) References Cited

U.S. PATENT DOCUMENTS

| 4,897,630 A * | 1/1990 | Nykerk ................. B60R 25/04 340/309.16 |
| 7,332,890 B2 | 2/2008 | Cohen et al. |

(Continued)

OTHER PUBLICATIONS

Notification of Transmittal of the International Search Report and the Written Opinion of the International Searching Authority for PCT/US2017/012304, dated Mar. 30, 2017, 16 pages.

(Continued)

*Primary Examiner* — Raj Chakraborty
(74) *Attorney, Agent, or Firm* — Jaffrey Watson Mendonsa & Hamilton LLC

(57) ABSTRACT

Systems and methods for using radio frequency signals and sensors to monitor environments (e.g., indoor environments) are disclosed herein. In one embodiment, a system for providing a wireless asymmetric network comprises a hub having one or more processing units and at least one antenna for transmitting and receiving radio frequency (RF) communications in the wireless asymmetric network and a plurality of sensor nodes each having a wireless device with a transmitter and a receiver to enable bi-directional RF communications with the hub in the wireless asymmetric network. The one or more processing units of the hub are configured to execute instructions to determine at least one of motion and occupancy within the wireless asymmetric network based on a power level of the RF communications.

20 Claims, 23 Drawing Sheets

(56) References Cited

U.S. PATENT DOCUMENTS

| | | | |
|---|---|---|---|
| 2005/0141465 A1* | 6/2005 | Kato | H04W 40/00 370/337 |
| 2007/0250212 A1* | 10/2007 | Halloran | A47L 5/30 700/245 |
| 2008/0049700 A1 | 2/2008 | Shah | |
| 2009/0207769 A1* | 8/2009 | Park | H04W 74/04 370/311 |
| 2012/0109420 A1 | 5/2012 | Lee et al. | |
| 2013/0128867 A1* | 5/2013 | Calcev | H04W 72/042 370/336 |
| 2014/0192695 A1 | 7/2014 | Priyantha et al. | |
| 2014/0207281 A1 | 7/2014 | Angle et al. | |
| 2014/0207282 A1* | 7/2014 | Angle | H04L 12/282 700/257 |
| 2014/0293850 A1 | 10/2014 | Huang et al. | |
| 2015/0098375 A1 | 4/2015 | Ree | |
| 2015/0168174 A1* | 6/2015 | Abramson | G01C 21/3697 701/408 |
| 2016/0147959 A1 | 5/2016 | Mariottini et al. | |

OTHER PUBLICATIONS

Notification Concerning Transmittal of International Preliminary Report on Patentability and Written Opinion for Application No. PCT/US2017/012304, dated Jul. 19, 2018, 13 pages.

Non-Final Office Action from U.S. Appl. No. 15/789,603, dated Jun. 12, 2018, 20 pages.

\* cited by examiner

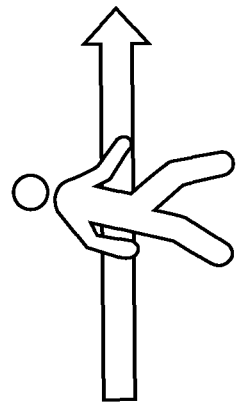
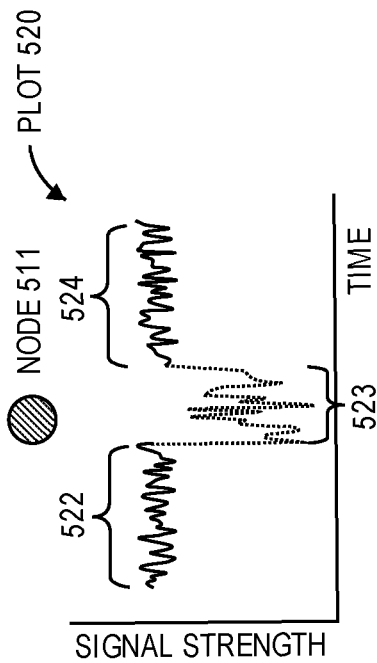
FIG. 5B
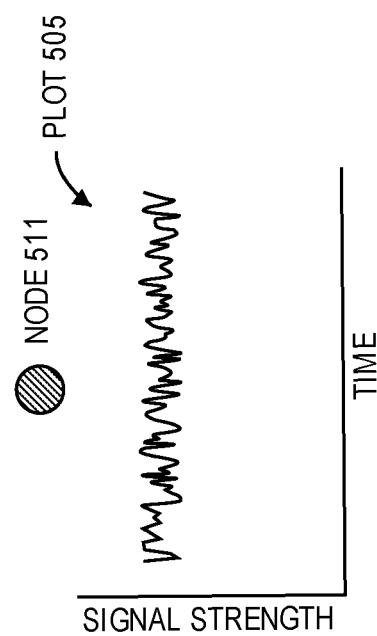
FIG. 5A

SYSTEMS AND METHODS FOR USING RADIO FREQUENCY SIGNALS AND SENSORS TO MONITOR ENVIRONMENTS

FIELD

Embodiments of the invention pertain to systems and methods for using radio frequency signals and sensors to monitor environments (e.g., indoor environments, outdoor environments).

BACKGROUND

In many indoor environments, it is desirable to detect occupancy or motion. Examples of such systems include motion and/or occupancy sensors used to trigger turning on/off of lights and motion sensors used to implement security systems. Current implementations of monitoring motion or presence of people and pets primarily often rely on a passive infrared (PIR) motion sensors, which detect the heat radiated by living creatures, sometimes combined with an ultrasonic sensor. This often presents a problem of false positive readings due to shortcomings of such sensors (susceptibility to temperature changes, lack of ability to differentiate between pets or people, and dead spots at larger distances). Additionally, these systems are limited to line-of-sight measurements over a relatively small area surrounding the sensor. As such, it is not possible to obtain information about situations in other rooms or locations not in the line-of-sight (such as areas blocked by wall, furniture, plants, etc).

SUMMARY

For one embodiment of the present invention, systems and methods for using radio frequency signals and sensors to monitor environments (e.g., indoor environments, outdoor environments) are disclosed herein. In one embodiment, a system for providing a wireless asymmetric network comprises a hub having one or more processing units and at least one antenna for transmitting and receiving radio frequency (RF) communications in the wireless asymmetric network and a plurality of sensor nodes each having a wireless device with a transmitter and a receiver to enable bi-directional RF communications with the hub in the wireless asymmetric network. The one or more processing units of the hub are configured to execute instructions to determine at least one of motion and occupancy within the wireless asymmetric network based on a power level of the received RF communications.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIG. 5A illustrates a plot of a RSSI measurements of a sensor network for a baseline condition in accordance with one embodiment.

FIG. 5B illustrates a plot of a RSSI measurements of a sensor network for a presence condition in accordance with one embodiment.

DETAILED DESCRIPTION

Figure 1:
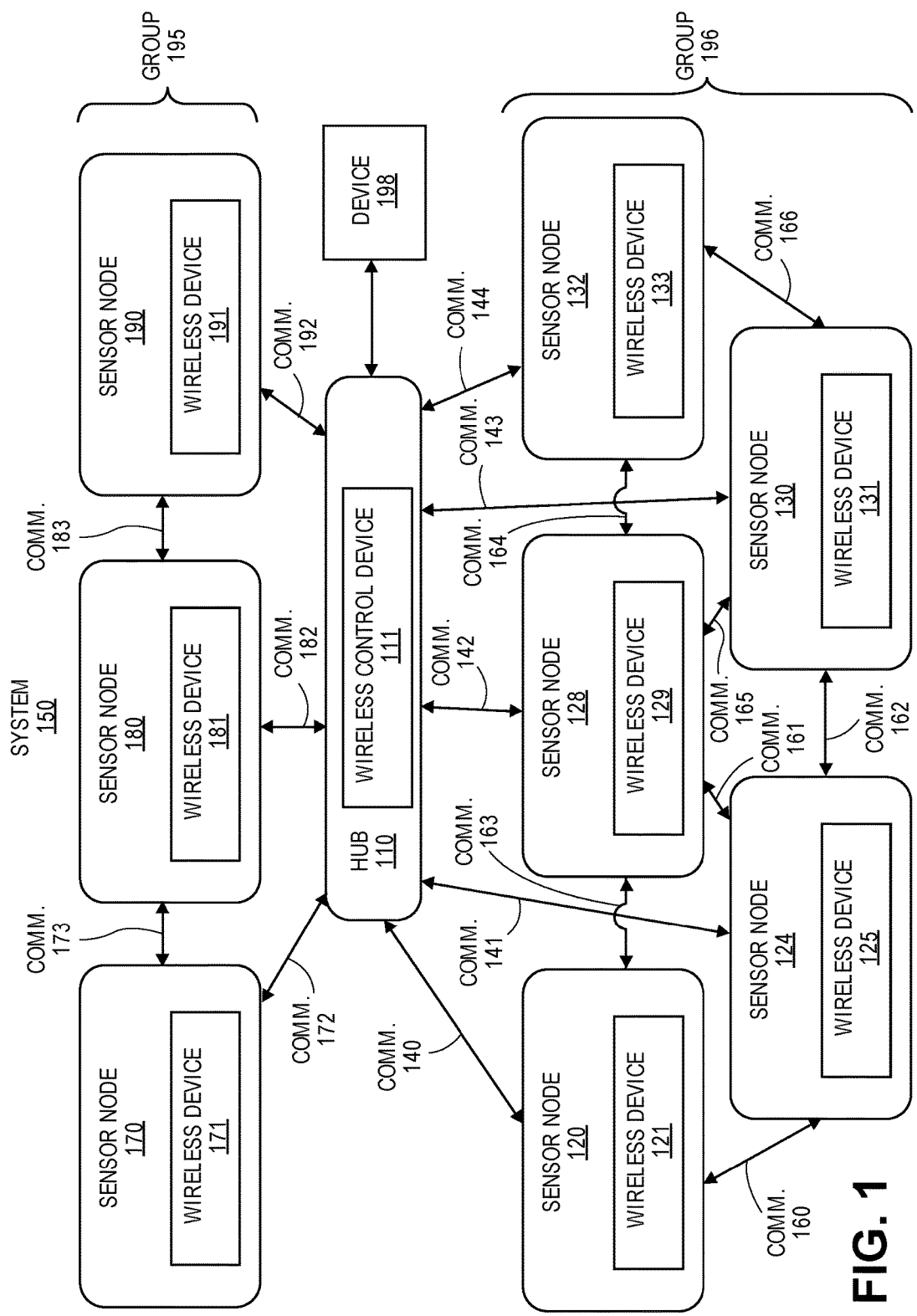
FIG. 1 shows a system primarily having a tree network architecture that is capable of mesh-like network functionality in which each group of sensor nodes is assigned a periodic guaranteed time slot for communicating in accordance with one embodiment.

In one embodiment, a system to detect at least one of motion and occupancy of environments (e.g., indoor environments, outdoor environments) is disclosed, based on the use of signal strength measurements within a wireless network. The signal strength information provides at least one of occupancy and motion detection without the strict line of sight limitations commonly seen in prior art motion and occupancy sensing systems. Methods for detecting motion and occupancy of an indoor environment are also disclosed. These may be used for a wide range of applications that make use of such information, such as security systems, and operation and control of building lighting and heating/cooling systems. Systems and methods using signal strength measurements within a wireless network to guide operation of a robot (e.g., an indoor robot, cleaning robot, robot in close proximity to indoor environment, pool cleaning robot, gutter cleaning robot, etc.) are also disclosed. Systems and methods can make use of data from other sensors (e.g., optical, image sensors, etc.) that are deployed in a wireless network to enhance operation of a robot operating within an indoor environment.

For the purpose of this, indoor environments are also assumed to include near-indoor environments such as in the region around building and other structures, where similar issues (e.g., presence of nearby walls, etc.) may be present.

Prior approaches for determining motion and occupancy are commonly used for security systems and control of lighting. Such information is typically not used for guiding of maintenance functions such as operation of cleaning robots. Indeed, such information could be used to guide the operation of the same, since the provided information may be used to identify regions of an indoor environment potentially in need of cleaning.

It is therefore desirable to implement a motion and occupancy sensing system that alleviates the aforementioned shortcomings of prior art motion and occupancy sensing systems. Such systems may then be used to improve efficacy and operation of indoor monitoring and control systems such as security systems and lighting/heating/cooling control systems. Furthermore, it is desirable to use the information provided by such as system to guide operation of indoor systems such as cleaning robots.

In one embodiment, sensor nodes of the present design consume significantly less power in comparison to power consumption of nodes of prior approaches at least partially due to having a receiver of the sensor nodes of the present design operable for a shorter time period. A non-repeating timeslot definition signal also saves time and reduces network congestion and bandwidth requirements in comparison to the prior approaches which require the timeslot definition signal to be repeated frequently.

In one embodiment, an asymmetry in power availability may be exploited to provide long range of communication in a wireless asymmetric network architecture while maintaining long battery life for nodes that are powered by a battery source. In an exemplary embodiment, a communication range of 20 meters between communicating nodes may be achieved while providing a long battery life (e.g., approximately 10 years, at least ten years) in battery operated nodes. This may be achieved by implementing an energy aware networking protocol in accordance with embodiments of this invention. Specifically, a tree-like network architecture having mesh based features may be used where long-life battery operated nodes are used on the terminal ends of the tree.

An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein. Another exemplar wireless network architecture has been described in U.S. patent application Ser. No. 14/925,889 filed on Oct. 28, 2015.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

The system may primarily have a tree network architecture for standard communications (e.g., node identification information, sensor data, node status information, synchronization information, localization information, other such information for the wireless sensor network, time of flight (TOF) communications, etc.).

A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

FIG. 1 shows a system primarily having a tree network architecture that is capable of mesh-like network functionality in which each group of sensor nodes is assigned a periodic guaranteed time slot for communicating in accordance with one embodiment. The system 150 may establish a mesh-like network architecture for determining locations of sensor nodes based on a threshold criteria (e.g., movement of at least one node by a certain distance, a change in path length between a node and the hub by a certain distance) being triggered. The system 150 includes a hub 110, a first group 195 of nodes 170, 180, and 190 and a second group 196 of nodes 120, 124, 128, 130, 132. The sensor nodes can be assigned into different groups. In another example, the group 196 is split into a first subgroup of nodes 120 and 124 and a second subgroup of nodes 128, 130, and 132. In one example, each group (or subgroup) is assigned a different periodic guaranteed time slot for communicating with other nodes or hubs.

The hub 110 includes the wireless device 111, the sensor node 120 includes the wireless device 121, the sensor node 124 includes the wireless device 125, the sensor node 128 includes the wireless device 129, the sensor node 130 includes the wireless device 131, the sensor node 132 includes the wireless device 133, the sensor node 170 includes the wireless device 171, the sensor node 180 includes the wireless device 181, and the sensor node 190 includes the wireless device 191. Additional hubs that are not shown can communicate with the hub 110 or other hubs. The hub 110 communicates bi-directionally with the sensor nodes.

These communications include bi-directional communications 140-144, 172, 182, and 192 in the wireless asymmetric network architecture. The sensor nodes communicate bi-directionally with each other based on communications 161-166, 173, and 183 to provide the mesh-like functionality for different applications including determining locations of the hub and sensor nodes.

In one embodiment, the control device 111 of the hub 110 is configured to execute instructions to determine or negotiate a timing of a periodic guaranteed time slot for each group of sensor nodes one time using a single timeslot definition signal.

The hub is also designed to communicate bi-directionally with other devices including device 198 (e.g., client device, mobile device, tablet device, computing device, smart appliance, smart TV, etc.).

By using the architecture illustrated in FIG. 1, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

A Received Signal Strength Indicator (RSSI) is a measure of the power of a RF signal being received by a device. In an example wireless network where multiple nodes are communicating with a central hub and each other at regular periods, it is possible to measure and record RSSI values over time. When any given node senses an RF signal from within the network, it can record or log an associated RSSI value and the source of signal's origin. This can be performed during scheduled routine/maintenance communication or on demand.

FIG. 1 shows communication in an exemplar wireless sensor network. In this network, RSSI can be measured by at least one of the hub and any node during one or more of the communication signaling events, including but not limited to communication from the hub to one or more nodes, communication from a node to the hub, or communication between nodes. RSSI can be measured by the hub or by any of the nodes with respect to communication between the hub and said node, or even for signals detected related to communication between the hub and another node.

Figure 2:
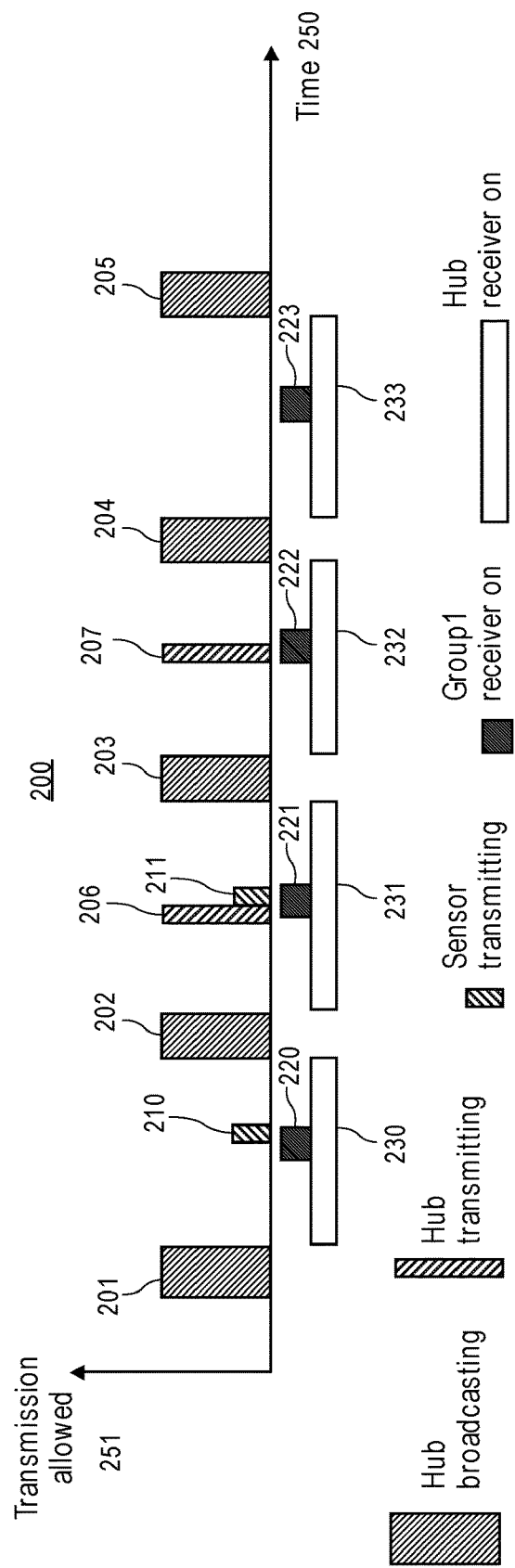
FIG. 2 illustrates a diagram 200 having communications being transmitted by a hub and groups of wireless nodes in a wireless network architecture in accordance with one embodiment.

FIG. 2 illustrates a diagram 200 having communications being transmitted by a hub and groups of wireless nodes in a wireless network architecture in accordance with one embodiment. The diagram 200 illustrates a vertical axis (transmit power 251) versus a horizontal axis (time line 250) for communications in a wireless sensor network. A broadcast beacon signal 201-205 is periodically repeated (e.g., 50 milliseconds, 100 milliseconds, 200 milliseconds, etc.) on a time line 250. The broadcast beacon signal may include address information (e.g., optional MAC address info which defines a unique identifier assigned to a network interface (e.g., hub) for communications on a physical network segment) and also information about frames as discussed in conjunction with the description of FIG. 6 of application Ser. No. 14/925,889 which has been incorporated by reference in its entirety. A timeslot definition signal (e.g., timeslot definition signal 656 of application Ser. No. 14/925,889) has been previously defined once (non-repeating) to define timeslots that correspond to time periods 220-223 for a group of sensor nodes having operational receivers.

In one example, a sensor detects a triggering event that causes the sensor to generate and transmit an alarm signal during a next guaranteed time slot or possibly prior to the next guaranteed time slot. The hub receives the alarm signal and determines an action (e.g., repeating the alarm signal which causes all nodes to wake, causing an alarm signal to be sent to a home owner, police station, fire station, ambulance, etc.) based on receiving the alarm signal. Upon waking other sensor nodes, the hub may receive additional communications from other sensors. The hub can then determine an appropriate action based on the additional communications. For example, all sensors after receiving a wake signal from the hub may capture images and transmit the images to the hub for analysis.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art. In one example, the RF communications have a frequency range of approximately 500 MHz up to approximately 10 GHz (e.g., approximately 900 MHz, 2.4 GHz, 5 GHz, etc.). The RF communications are desired to be transmitted through walls, glass, and other structures in contrast to IR communications. RF communications may be transmitted at a certain time period (e.g., every 30-90 seconds) to determine if a sensor node is operational. RF communications may be monitored and analyzed at a certain time period (e.g., 1-10 seconds) to determine a power level for the received communications at a given time.

The implementation of the radio-frequency communication between the terminal nodes and the hubs may be implemented in a variety of ways including narrow-band, channel overlapping, channel stepping, multi-channel wide band, and ultra-wide band communications.

Figure 3:
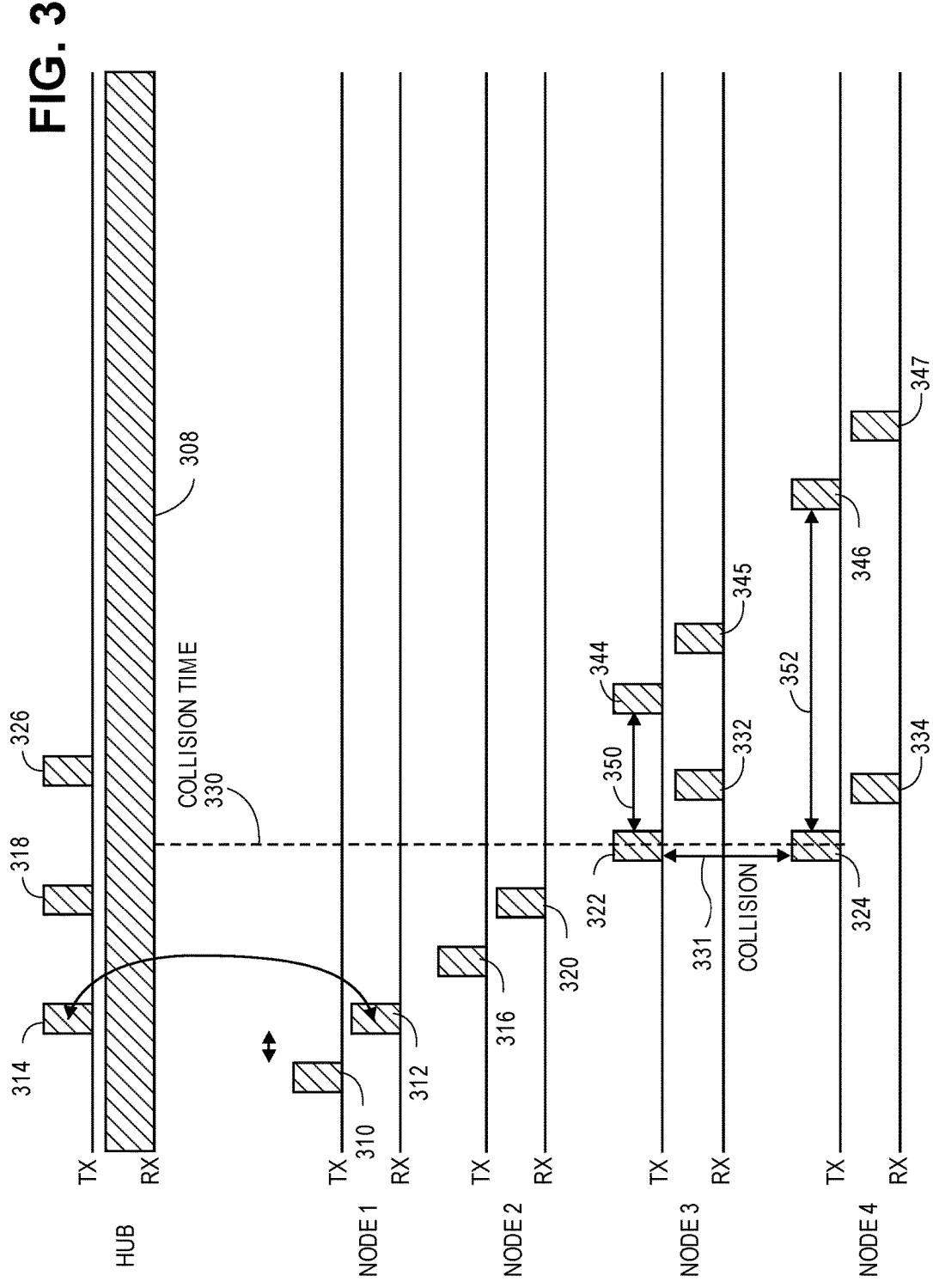
FIG. 3 illustrates transmit and receive time lines for a hub and nodes 1-4 of the wireless asymmetric network architecture in accordance with one embodiment.

In one embodiment, the hub may instruct one or more of the nodes to shift the timing of a future transmit/receive communications to avoid collisions on the network. FIG. 3 illustrates a time sequence for shifting transmit and receive communications to avoid collisions of a wireless asymmetric network architecture in accordance with one embodiment. FIG. 3 illustrates transmit and receive time lines for a hub and nodes 1-4 of the wireless asymmetric network architecture in accordance with one embodiment. Initially, node 1 transmits a communication to the hub during a transmit window 310 of the transmit timeline (TX). In this embodiment, the hub listens continuously as illustrated by the continuous receive window 308 of the hub. The hub then calculates a transmit window minus receive window separation of node 1 to determine a timing for a receive window 312 of the receive timeline (RX) of node 1. The hub sends a communication to node 1 during transmit window 314 of the hub and the receive window 312 of node 1 receives this communication. In other words, a receiver of RF circuitry (or receiver functionality of a transceiver) of wireless device of node 1 is operable to receive during receive window 312 in order to receive communications.

In a similar manner, the hub communicates or transacts with node 2. Node 2 transmits a communication to the hub during the transmit window 316 of the transmit timeline (TX) of node 2. The hub then calculates a transmit window minus receive window separation of node 2 to determine a timing for a receive window 320 of the receive timeline (RX) of node 2. The hub sends a communication to node 2 during a transmit window 318 of the hub and the receive window 320 of node 2 receives this communication.

The hub then detects a communication from node 3 during a transmit window 322 of node 3 and at the same time or approximately the same time also detects a communication from node 4 during a transmit window 324 of node 4. At this collision time 330, the hub detects that a collision 331 has occurred (e.g., when the hub detects that part or all of a transmission is unintelligible or irreversibly garbled). In other words, the communications from node 3 and node 4 combine to form an unintelligible transmission (e.g., an irreversibly garbled transmission) that is received by the hub at or near collision time 330. The hub then can calculate the next receive window for any of the nodes that transmitted with the unintelligible or garbled transmission during the unintelligible or garbled transmit window (e.g., transmit windows 322 and 324). In that next receive window (e.g., receive windows 332 and 334) for nodes 3 and 4 or any further subsequent receive windows (e.g., receive windows 345 and 347), the hub with transmit window 326 can instruct the colliding nodes (e.g., nodes 3 and 4) to shift their respective transmit and receive windows by different time delays or time periods as illustrated in FIG. 3. In this example, the time delay or shift 350 from transmit window 322 to transmit window 344 of node 3 is less than the time delay or shift 352 from transmit window 324 to transmit window 346 of node 4 in order to avoid a collision based on transmissions during transmit window 344 and transmit window 346.

This time delay or shift may be randomly determined using a random number generator in each node, for example, or may be determined and instructed by the hub. The hub may choose from available future windows and offer them as a set to the colliding nodes. These colliding nodes may then choose one of these randomly, for example. Once this selection is made, the collision should be avoided for future windows. On the other hand, if a collision occurs again in the next window (for example, because two of the colliding nodes happened to choose the same time shift), the process can be repeated until all collisions are avoided. In this way, the hub can arbitrate the operation of the entire network without requiring significant complexity from the nodes, thus reducing the energy required for operation of the nodes.

Figure 4A:
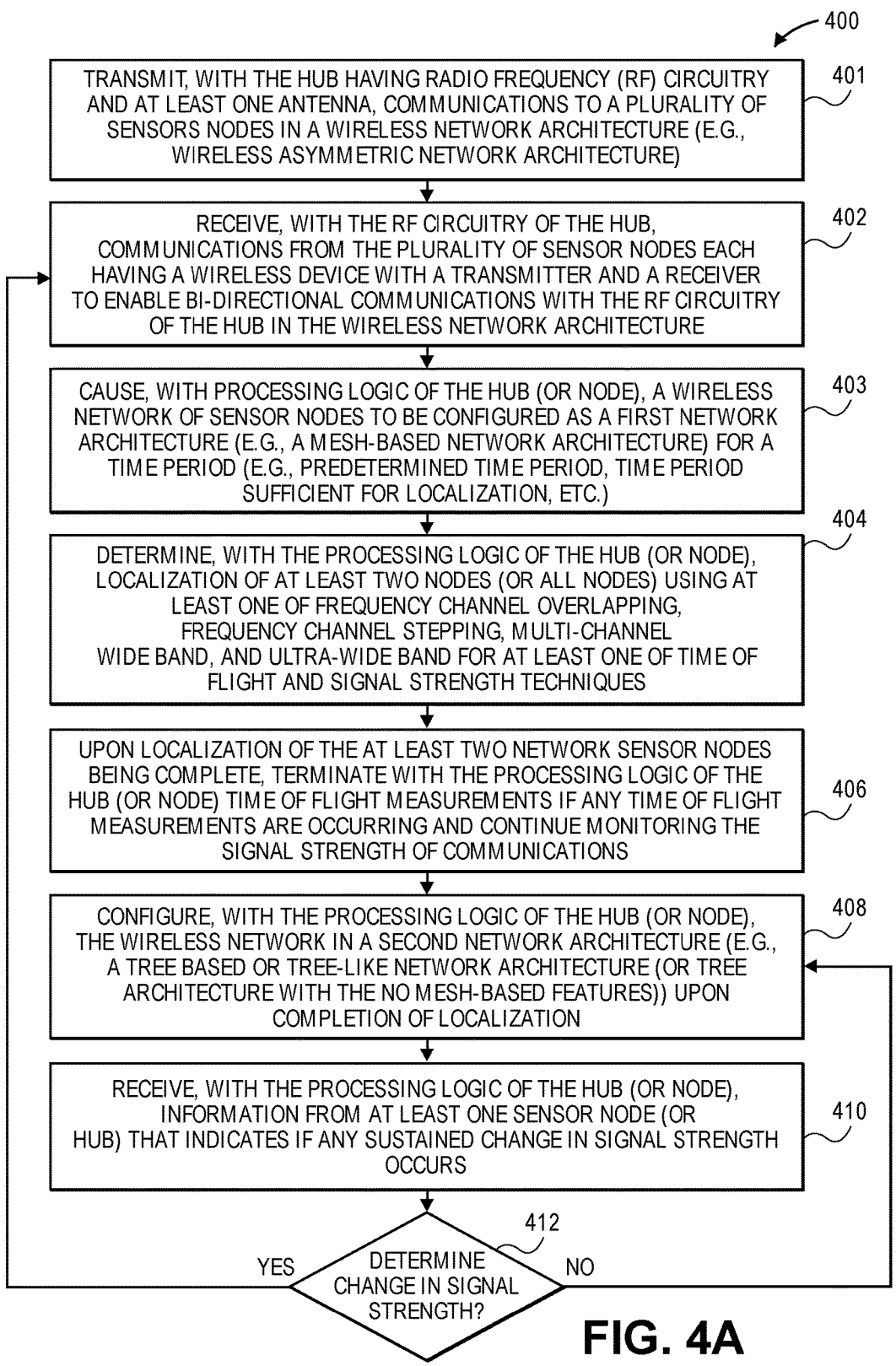
FIGS. 4A and 4B illustrate methods for location estimation of nodes upon detection of a change in signal strength and also detection of motion or occupancy in accordance with one embodiment.
Figure 4B:
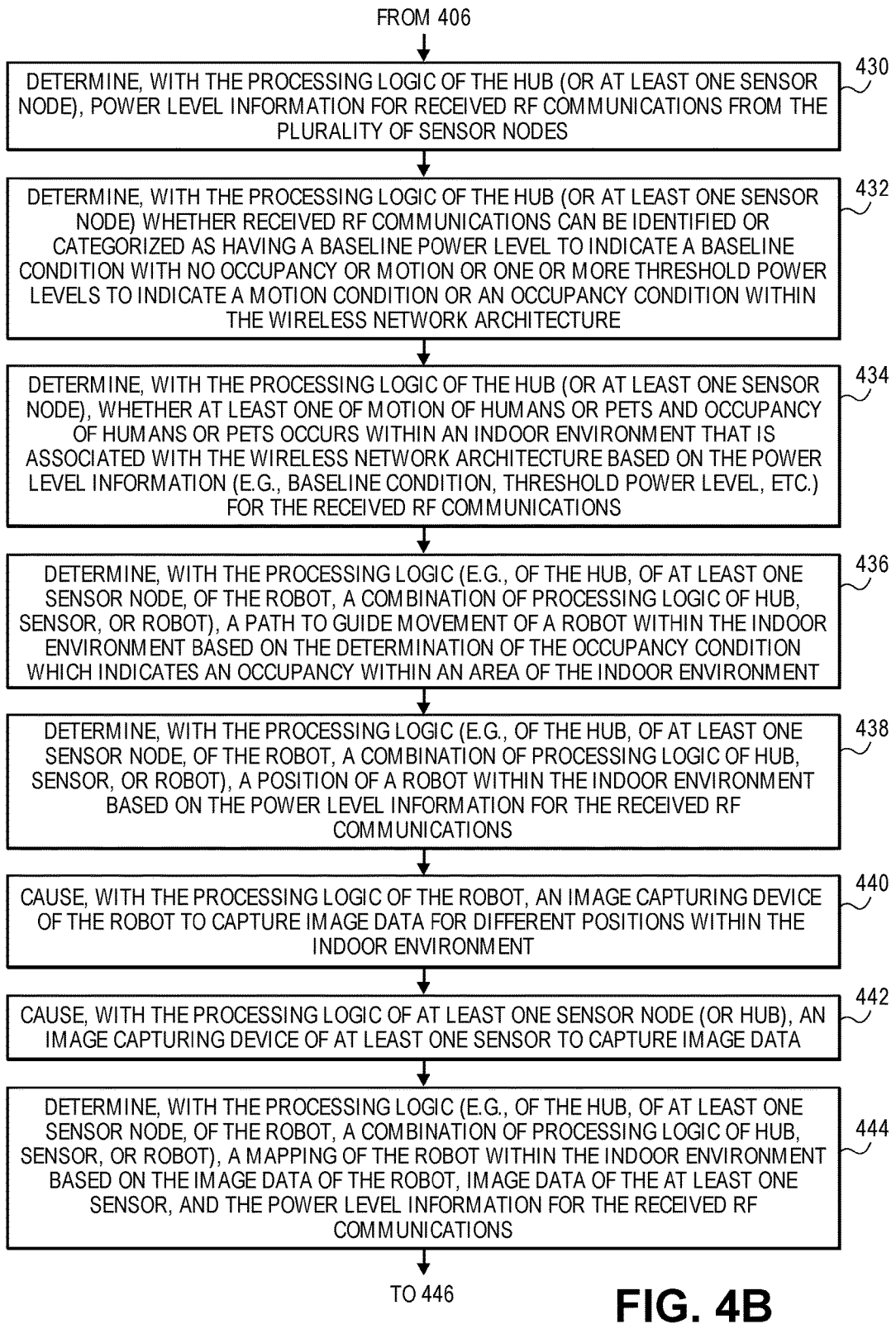
Figure 4B:
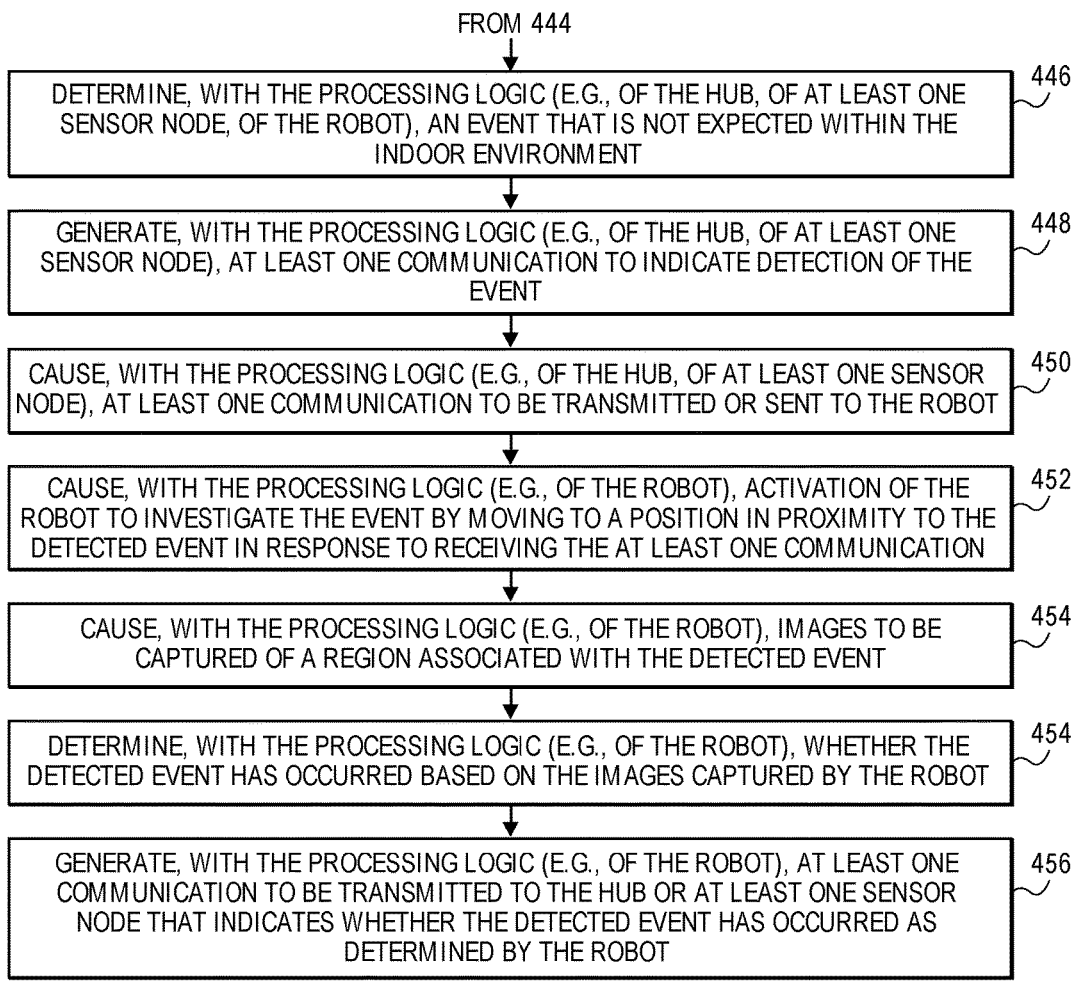

FIGS. 4A and 4B illustrate methods for location estimation of nodes upon detection of a change in signal strength and also detection of motion or occupancy in accordance with one embodiment. The operations of methods 400 and 490 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub at least partially performs the operations of methods 400 and 490. At least one sensor node may also at least partially perform some of the operations of methods 400 and 490.

At operation 401, the hub having radio frequency (RF) circuitry and at least one antenna transmits communications to a plurality of sensor nodes in the wireless network architecture (e.g., wireless asymmetric network architecture). At operation 402, the RF circuitry and at least one antenna of the hub receives communications from the plurality of sensor nodes each having a wireless device with a transmitter and a receiver to enable bi-directional communications with the RF circuitry of the hub in the wireless network architecture. At operation 403, processing logic of the hub (or node) having a wireless control device initially causes a wireless network of sensor nodes to be configured as a first network architecture (e.g., a mesh-based network architecture) for a time period (e.g., predetermined time period, time period sufficient for localization, etc.). At operation 404, the processing logic of the hub (or node) determines localization of at least two nodes (or all nodes) using at least one of frequency channel overlapping, frequency channel stepping, multi-channel wide band, and ultra-wide band for at least one of time of flight and signal strength techniques as discussed in the various embodiments disclosed in application Ser. No. 14/830,668 and incorporated by reference herein. At operation 406, upon localization of the at least two network sensor nodes being complete, the processing logic of the hub (or node) terminates time of flight measurements if any time of flight measurements are occurring and continues monitoring the signal strength of communications with the at least two nodes. Similarly, the at least two nodes may monitor the signal strength of communications with the hub. At operation 408, the processing logic of the hub (or node) configures the wireless network in a second network architecture (e.g., a tree based or tree-like network architecture (or tree architecture with no mesh-based features)) upon completion of localization. At operation 410, the processing logic of the hub (or node) may receive information from at least one of the sensor nodes (or hub) that indicates if any sustained change in signal strength occurs. Then, at operation 412, the processing logic of the hub (or node) determines (either on its own or based on information received from at least one of the sensor nodes) whether there has been a sustained change in signal strength to a particular node. If so, the method returns to operation 402 with the processing logic of the hub configuring the network as the first network architecture for a time period and re-triggering localization at operation 404 using at least one of frequency channel overlapping, frequency channel stepping, multi-channel wide band, and ultra-wide band for at least one of time of flight and signal strength techniques (e.g., time of flight and signal strength techniques) disclosed herein. Otherwise, if no sustained change in signal strength for a particular node, then the method returns to operation 408 and the network continues to have second network architecture.

A method 490 for determining motion or occupancy in a wireless network architecture is illustrated in FIG. 4B, in one example, upon reaching operation 406 of FIG. 4A in which processing logic of the hub (or at least one sensor node) monitors the signal strength of communications within the wireless network architecture. In another example, the operations of FIG. 4B occur simultaneously with the operations of FIG. 4A or independently from the operations of FIG. 4A. In another example, one or more of the operations in FIG. 4B may be skipped, or the order of the operations may be changed.

At operation 430, the one or more processing units (or processing logic) of the hub (or at least one sensor node) determines power level information for received RF communications from the plurality of sensor nodes. At operation 432, the processing logic of the hub (or at least one sensor node) determines whether received RF communications can be identified or categorized as having a baseline power level to indicate a baseline condition with no occupancy or motion or one or more threshold power levels to indicate a motion condition or an occupancy condition within the wireless network architecture. For example, a first threshold power level below a baseline power level may indicate motion of a human or pet between sensor node pairs, a second threshold power level further below a baseline power level may indicate occupancy of a smaller human or pet, and a third threshold power level further below a baseline power level may indicate occupancy of a larger human between sensor node pairs. A fourth threshold power level above a baseline power level may indicate if a reflective surface or other disturbance is positioned between sensor node pairs.

At operation 434, the processing logic of the hub (or at least one sensor node) determines whether at least one of motion of humans or pets and occupancy of humans or pets occurs within an environment (e.g., indoor environment, outdoor environment) that is associated with the wireless network architecture based on the power level information (e.g., baseline condition, threshold power level, etc.) for the received RF communications.

In one example, the power level information comprises received signal strength indicator (RSSI) information including instantaneous values of RSSI to be compared with threshold RSSI values to determine whether a baseline condition or threshold power level condition occurs which indicates whether a motion condition or an occupancy condition occurs, respectively.

In another example, the power level information comprises received signal strength indicator (RSSI) information to be used to determine at least one of time averaged RSSI and frequency analysis of variations of RSSI to determine the motion condition or the occupancy condition.

At operation 436, the processing logic (e.g., of the hub, of at least one sensor node, of the robot, a combination of processing logic of hub, sensor, or robot) determines a path to guide movement of a robot within the environment based on the determination of the occupancy condition which indicates an occupancy within an area of the indoor environment. In one example, a path is chosen in order for the robot to avoid being in proximity (e.g., robot located in a different room or area in comparison to the occupants) to the occupants. In another example, the path is chosen order for the robot to be in close proximity (e.g., 3-10 feet, same room or area) to the occupants.

At operation 438, the processing logic (e.g., of the hub, of at least one sensor node, of the robot, a combination of processing logic of hub, sensor, or robot) determines a position of a robot within the environment based on the power level information for the received RF communications. This estimated position may help with respect to calibration of the robot.

At operation 440, the processing logic of the robot causes an image capturing device of the robot to capture image data for different positions within the indoor environment. At operation 442, the processing logic of at least one sensor node (or hub) causes an image capturing device of at least one sensor to capture image data.

At operation 442, the processing logic (e.g., of the hub, of at least one sensor node, of the robot, a combination of processing logic of hub, sensor, or robot) determines a mapping of the robot within the environment based on the image data of the robot, image data of the at least one sensor, and the power level information for the received RF communications. The mapping may include a coordinate system for a robot within the indoor environment.

At operation 444, the processing logic (e.g., of the hub, of at least one sensor node, of the robot) determines an event that is not considered normal within the environment. The event may be based at least partially on power level information for the received RF communications and also based on a local sensor that has detected the event (e.g., open window, unlocked door, leak, moisture, change in temperature, etc.).

At operation 448, the processing logic (e.g., of the hub, of at least one sensor node) generates at least one communication to indicate detection of the event. At operation 450, the processing logic (e.g., of the hub, of at least one sensor node) transmits or sends the at least one communication to the robot. At operation 452, the processing logic (e.g., of the robot) causes activation of the robot to investigate the event by moving to a position in proximity to the detected event in response to receiving the at least one communication. At operation 454, the processing logic (e.g., of the robot) captures images of a region associated with the detected event. At operation 456, the processing logic (e.g., of the robot) determines whether the detected event has occurred based on the images captured by the robot. At operation 458, the processing logic (e.g., of the robot) generates and transmits at least one communication that indicates whether the detected event has occurred as determined by the robot.

FIG. 5A illustrates a plot of a RSSI measurements of a sensor network for a baseline condition in accordance with one embodiment. A wireless node 510 communicates with a wireless node 511 of a wireless sensor network. A plot 505 of signal strength (e.g., RSSI measurements) versus time illustrates example RSSI values received by one RF device (e.g., node 510) from another RF device (e.g., node 511) during a baseline condition in which no presence (e.g., human, pet, etc.) or interference occurs between these nodes. It should be noted that one of the nodes could also be a hub. In this baseline condition, with no human presence between the nodes, the RSSI values represent baseline values (e.g., 40-50 db) with relatively minor measurement noise.

FIG. 5B illustrates a plot of a RSSI measurements of a sensor network for a presence condition in accordance with one embodiment. A wireless node 510 communicates with a wireless node 511 of a wireless sensor network. A plot 520 of signal strength (e.g., RSSI measurements) versus time illustrates example RSSI values received by one RF device (e.g., node 510) from another RF device (e.g., node 511) during a presence condition in which a presence (e.g., human, pet, etc.) or interference (e.g., an object that is not normally positioned between the nodes) occurs between these nodes. It should be noted that one of the nodes could also be a hub. In this presence condition, for example, if a person passes between the two nodes, the RSSI values are changed in comparison to the values of the plot 505. This change in RSSI values can be used to identify presence and motion. This may be achieved by detecting the instantaneous value of RSSI, by using a time average value of RSSI, by performing a frequency analysis of the RSSI variation and responding to specific variation frequencies, or by other such techniques as would be apparent to one of skill in the art.

In one example, a first portion 522 and a third portion 524 of the RSSI signal include values that are similar to the RSSI values during the baseline condition of plot 505. A second portion 523 includes values that are statistically lower than the first and third portions. Different signatures for baseline conditions and other conditions can be determined and then used to match with signatures of RSSI values. A human likely passes between the nodes 510-511 during the second portion 523. A different signature (e.g., RSSI values less than baseline values and greater than the second portion 523) may indicate a pet or child has passed between the nodes.

Figure 6:
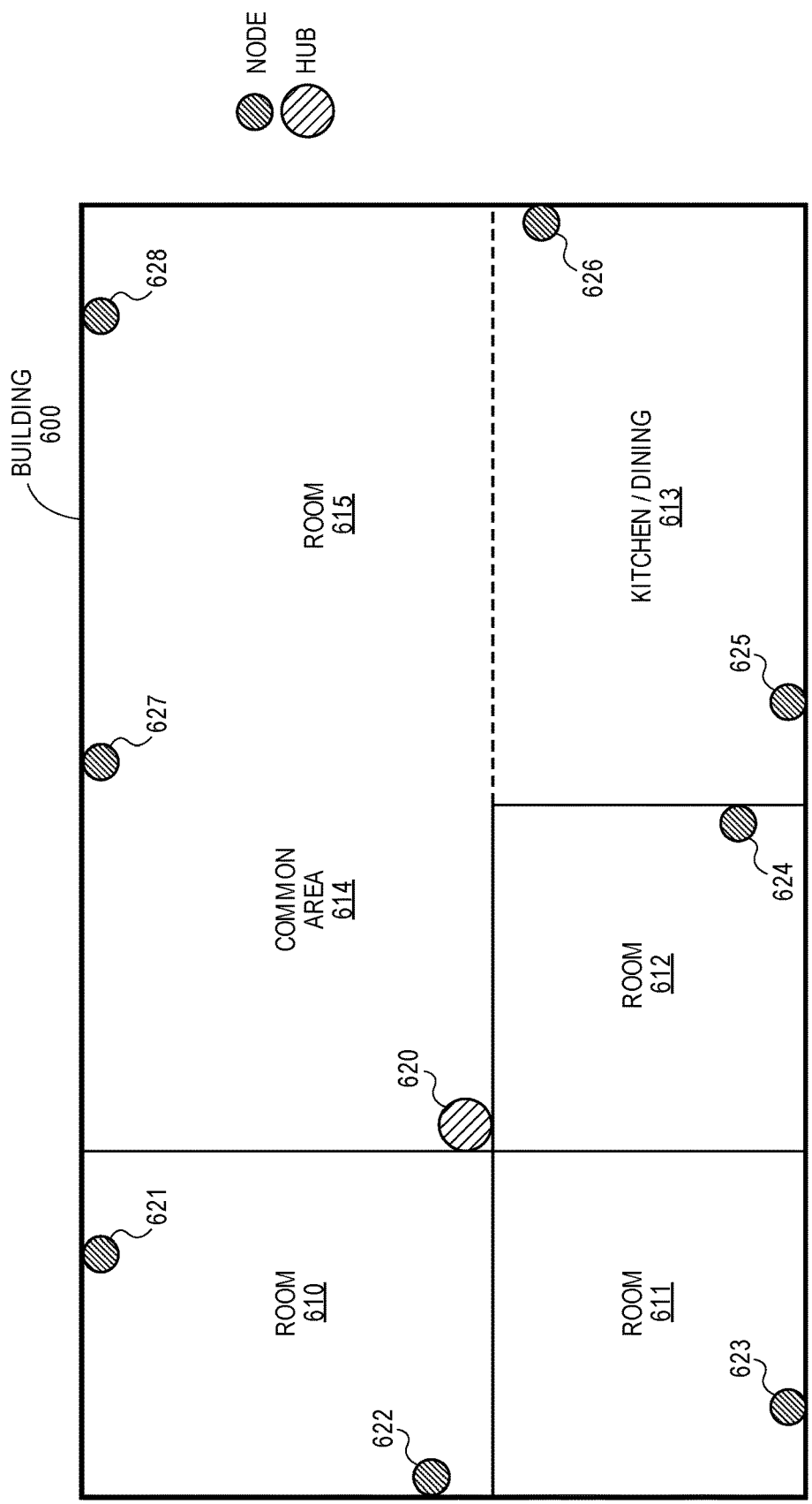
FIG. 6 illustrates an exemplary building (e.g., house) with nodes spread out in various rooms and a centrally located hub in accordance with one embodiment.

A network with multiple communicating nodes can be used to map out an area where human presence and motion occurred. FIG. 6 illustrates an exemplary building (e.g., house) with nodes spread out in various rooms and a centrally located hub in accordance with one embodiment. In one example, a location of the nodes is known via predefined user input or automatic localization by the nodes themselves. Systems and methods of localization are disclosed in application Ser. No. 14/830,668, which is incorporated by reference. In this example, the nodes 621-628 can be communicating with the hub 620 and amongst each other in the different rooms including rooms 621-623 (e.g., bedroom, office, storage, etc.), a kitchen/dining area 613, a common area 614, and a room 615 (e.g., living room, open area).

Figure 7:
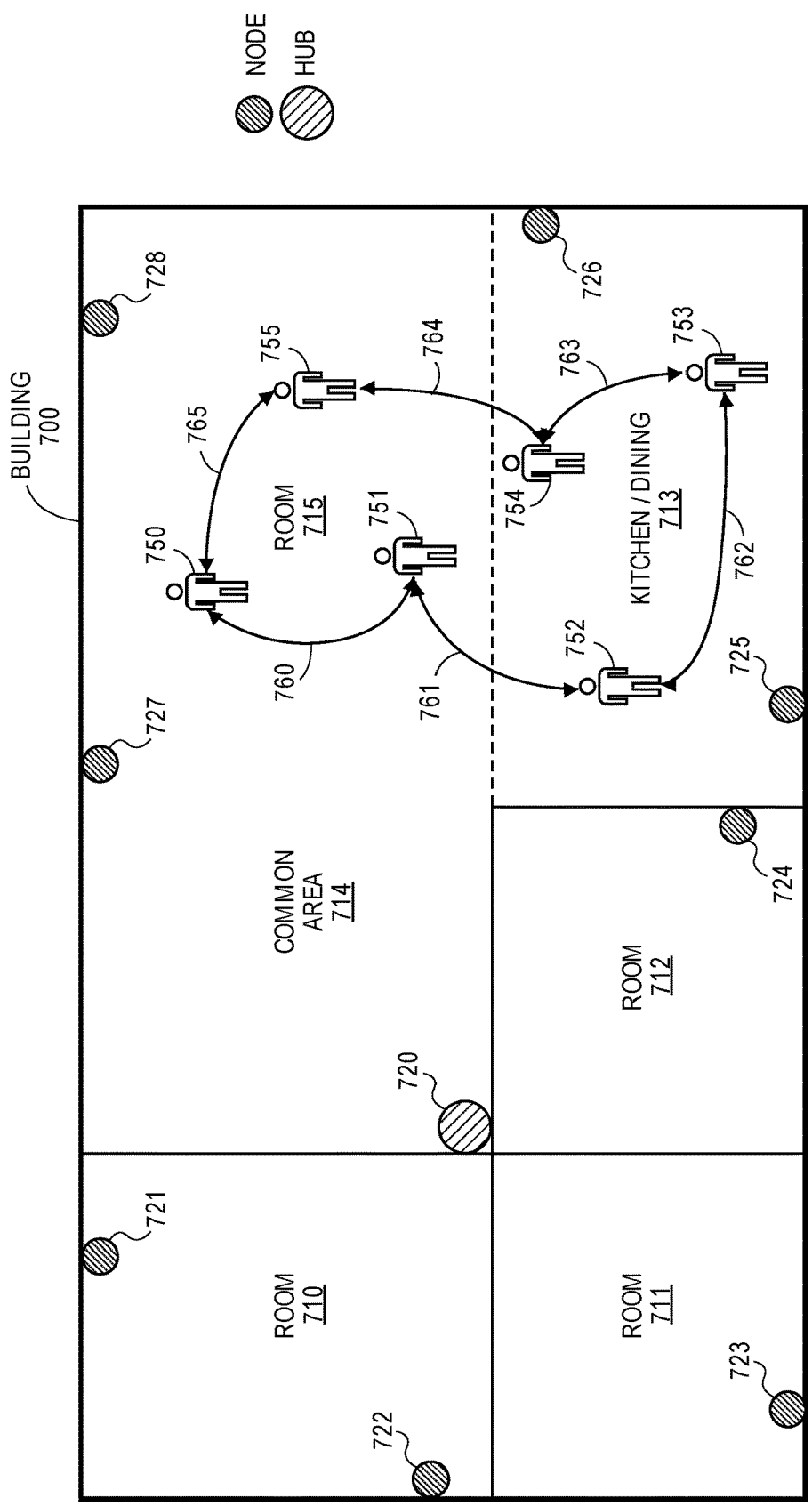
FIG. 7 illustrates an example of possible motion of a person or people in different areas of a building in accordance with one embodiment.

FIG. 7 illustrates an example of possible motion of a person or people in different areas of a building in accordance with one embodiment. In one example, the nodes 721-728 can be communicating with the hub 720 and amongst each other in the different rooms including rooms 721-723 (e.g., bedroom, office, storage, etc.), a kitchen/dining area 713, a common area 714, and a room 715. The nodes and hub of FIG. 7 can be located in similar positions with a building and have similar functionality in comparison to the nodes and hub of FIG. 6.

In FIG. 7, in one example, a human moves between positions 750-755 via paths 760-765. The sensors and hub can monitor movement of the human based on the RSSI measurements among the various node pairs.

Figure 8:
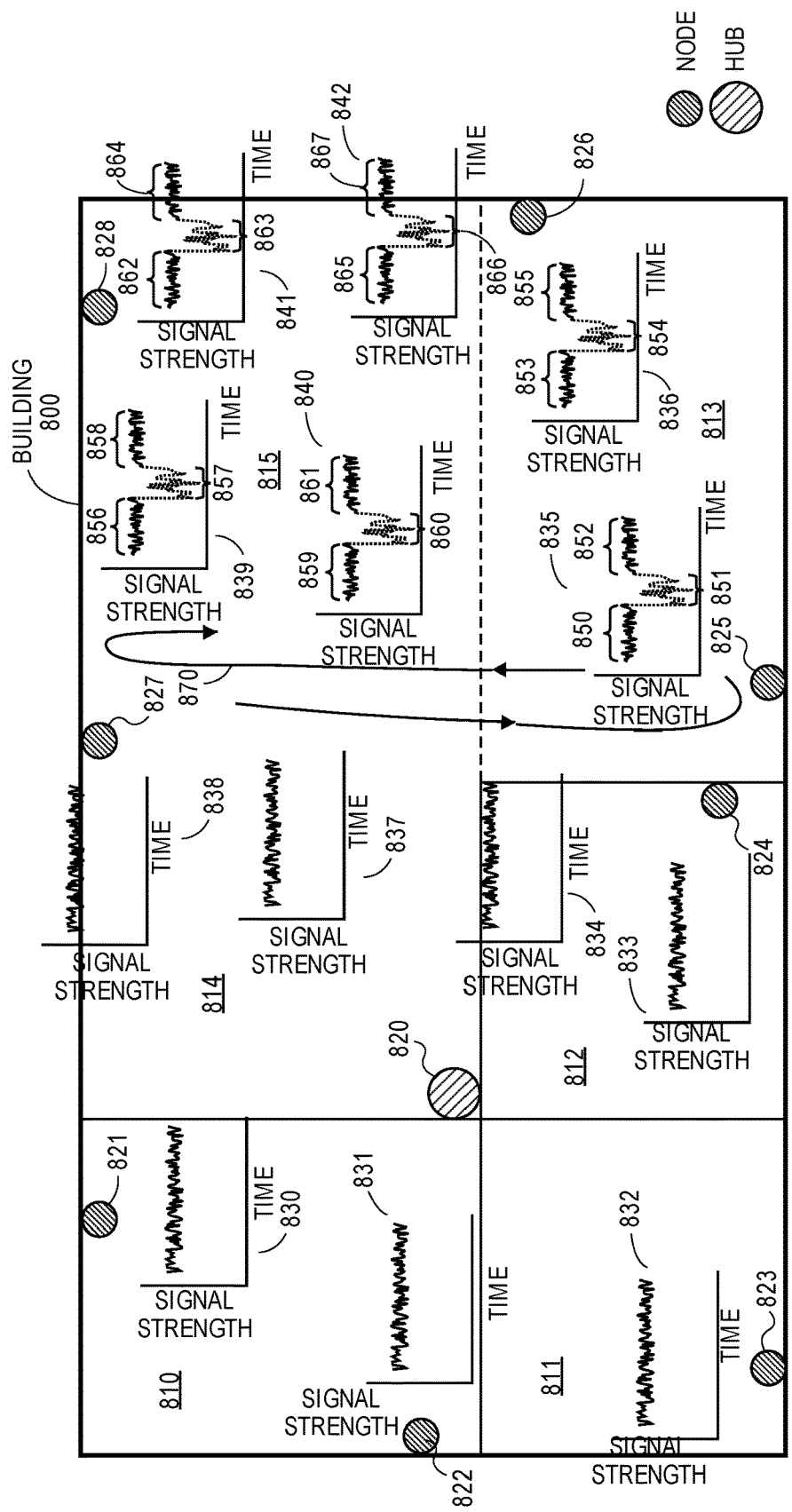
FIG. 8 illustrates an example of RSSI measurements based on possible motion of a person or people in different areas of a building in accordance with one embodiment.

FIG. 8 illustrates an example of RSSI measurements based on possible motion of a person or people in different areas of a building in accordance with one embodiment. In one example, the nodes 821-828 can be communicating with the hub 820 and amongst each other in the different rooms including rooms 821-823 (e.g., bedroom, office, storage, etc.), a kitchen/dining area 813, a common area 814, and a room 815. The nodes and hub of FIG. 8 can be located in similar positions within a building and have similar functionality in comparison to the nodes and hub of FIGS. 6 and 7. Given a presence/motion pattern as illustrated in the positions 750-755 and paths 760-765 of FIG. 7, FIG. 8 illustrates representative RSSI measurements amongst the various node pairs, with signal perturbations (e.g., plots 835, 836, 839-842 illustrate signal perturbations) for the pairs in the area of motion. Such data can, in turn, indicate to the local network in which areas people were present. The determination of presence can be made based on the instantaneous values of RSSI (with no presence or motion) compared to threshold values (with the presence of motion and/or occupancy), comparisons of time averaged RSSI related to analogous thresholds, frequency analysis of variations in RSSI, and other such techniques as would be apparent to one of skill in the art.

In one example, the plots 830-834 and 837-838 include RSSI measurements that do not include perturbations from presence or motion of humans. These RSSI measurements may be similar to the baseline condition as illustrated in FIG. 5A. The plots 835, 836, 839-842 include perturbations likely caused by a human passing between sensor pairs or sensor and hub pairs.

In one example, for plot 835, a first portion 850 and a third portion 852 of the RSSI signal include values that are similar to the RSSI values during a baseline condition (e.g., plot 505). A second portion 851 includes values that are statistically lower than the first and third portions. Different signatures for baseline conditions and other conditions can be determined and then used to match with signatures of RSSI values. A human likely passes between the node 825 and another node (e.g., 826-828) pairing during the second portion 851. For plot 836, a first portion 853 and a third portion 855 of the RSSI signal include values that are similar to the RSSI values during a baseline condition (e.g., plot 505). A second portion 854 includes values that are statistically lower than the first and third portions. A human likely passes between the node 826 and another node (e.g., 824, 825) pairing during the second portion 854. For plot 839, a first portion 856 and a third portion 858 of the RSSI signal include values that are similar to the RSSI values during a baseline condition (e.g., plot 505). A second portion 857 includes values that are statistically lower than the first and third portions. A human likely passes between a nearby node pairing (e.g., 827 and 828, etc.) during the second portion 854.

For plot 840, a first portion 859 and a third portion 861 of the RSSI signal include values that are similar to the RSSI values during a baseline condition (e.g., plot 505). A second portion 860 includes values that are statistically lower than the first and third portions. A human likely passes between a nearby node pairing (e.g., 827 and 826, 828 and 824 or 825, 821 and 826, etc.) during the second portion 854.

For plot 841, a first portion 862 and a third portion 864 of the RSSI signal include values that are similar to the RSSI values during a baseline condition (e.g., plot 505). A second portion 863 includes values that are statistically lower than the first and third portions. A human likely passes between a nearby node pairing (e.g., 828 and 826, etc.) during the second portion 863.

For plot 842, a first portion 865 and a third portion 867 of the RSSI signal include values that are similar to the RSSI values during a baseline condition (e.g., plot 505). A second portion 866 includes values that are statistically lower than the first and third portions. A human likely passes between a nearby node pairing (e.g., 828 and 826, etc.) during the second portion 866.

The RSSI implementation has several advantages over the PIR based measurement. RF measurements don't require line of sight unlike optical measurements like PIR. As such, motion and presence can be sensed across or through walls and other obstacles. Additionally, RSSI measurements are not sensitive to temperature and light fluctuations which can cause false positives in PIR. For example, direct sunlight or reflection onto a PIR sensor can result in a false positive reading or a missed reading (false negative).

Figure 9A:
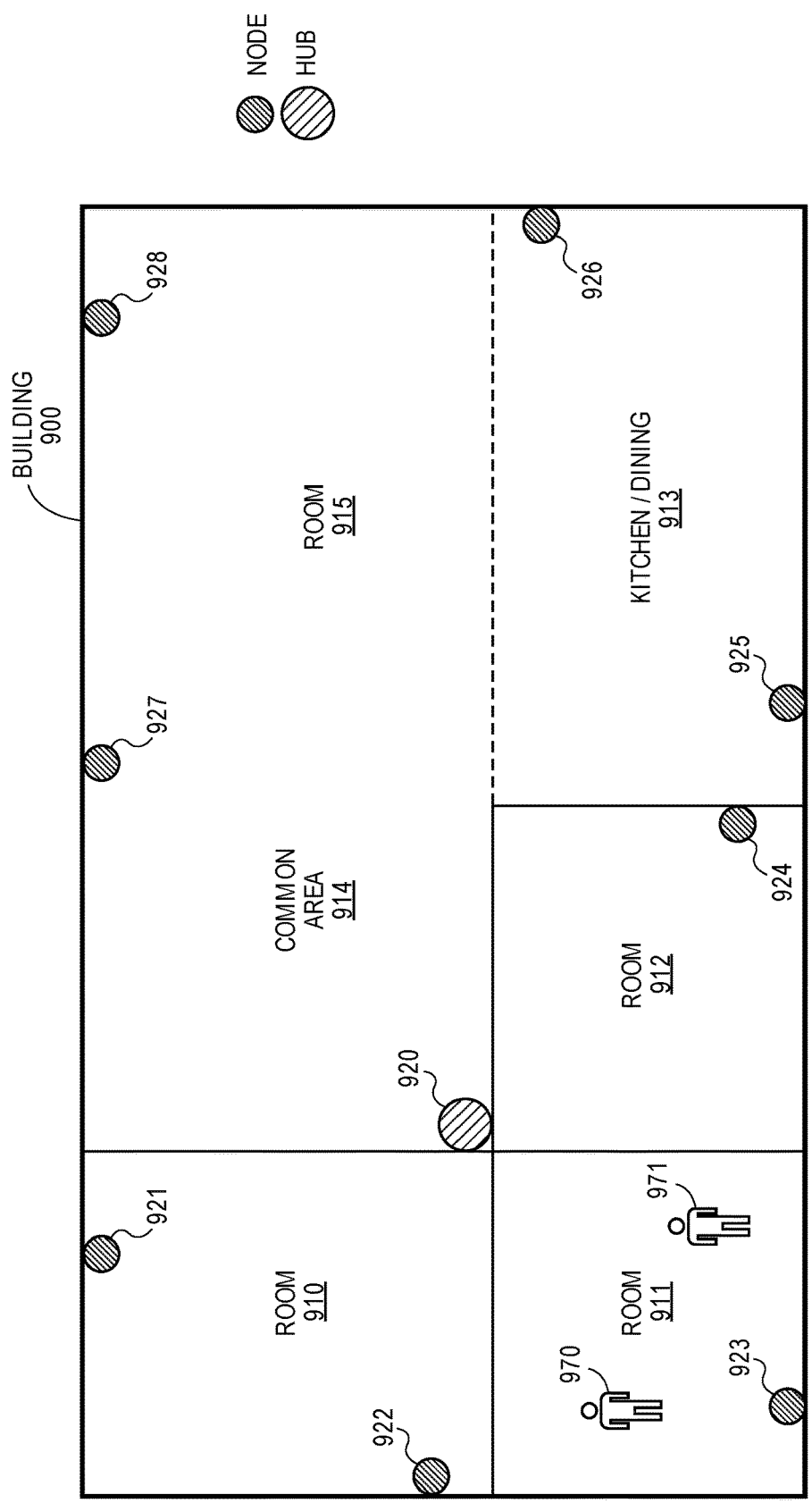
FIGS. 9A and 9B illustrate how occupancy can be detected based on RSSI measurements in accordance with one embodiment.
Figure 9B:
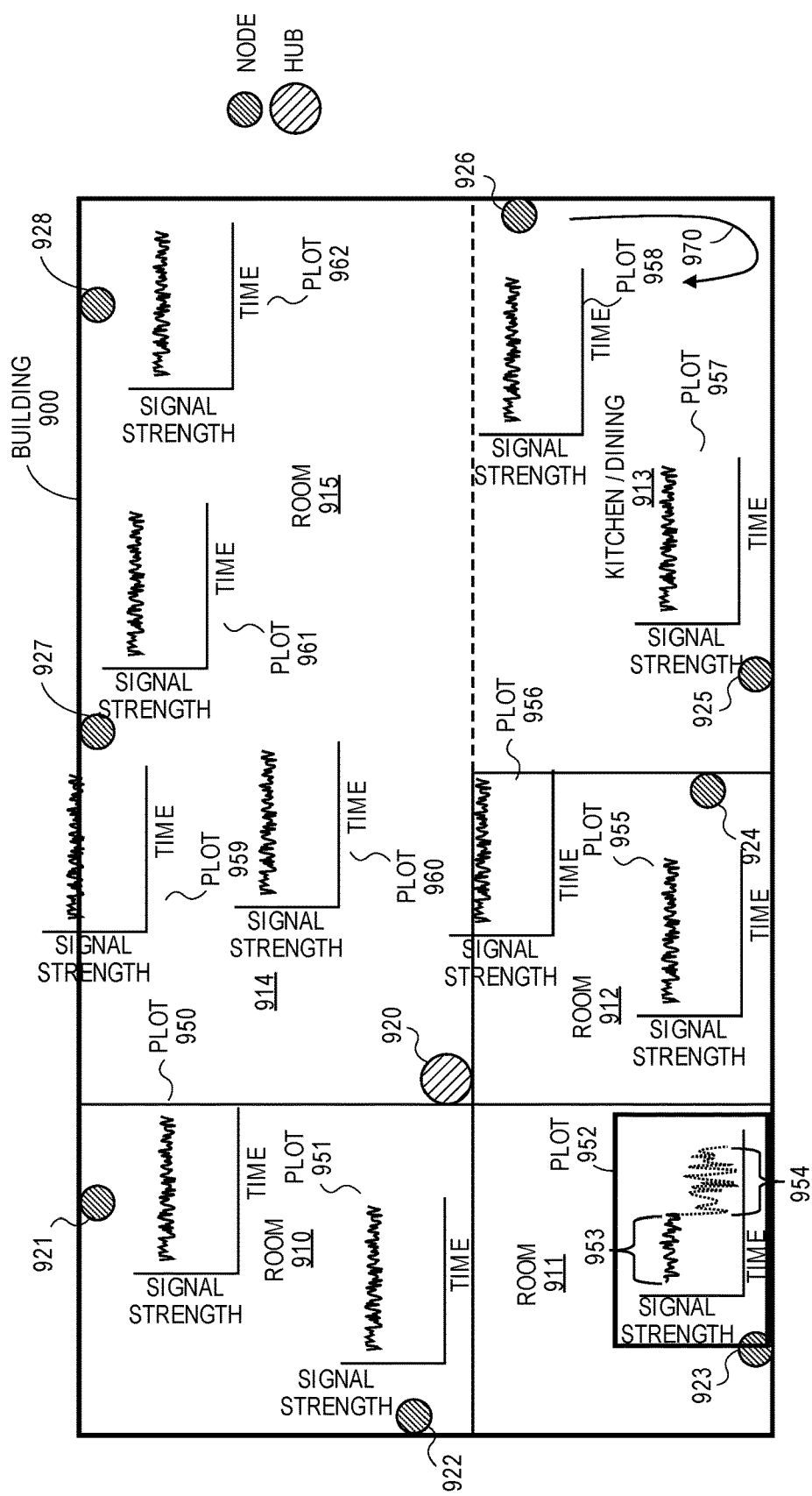

The RSSI information can also be used to detect occupancy. FIGS. 9A and 9B illustrate how occupancy can be detected based on RSSI measurements in accordance with one embodiment. In one example, the nodes 921-928 can be communicating with the hub 920 and amongst each other in the different rooms including rooms 921-923 (e.g., bedroom, office, storage, etc.), a kitchen/dining area 913, a common area 914, and a room 915 (e.g., living room, open area). Given a presence as illustrated with a human 970 and a human 971, FIG. 9B illustrates representative RSSI measurements amongst the various node pairs, with signal perturbations (e.g., plot 952 illustrates signal perturbations) for the pairs in the area of room 911. Such data can, in turn, indicate to the local network in which areas people (e.g., humans 970 and 971) were present. The determination of presence can be made based on the instantaneous values of RSSI (without presence of motion and/or occupancy) compared to threshold values (with the presence of motion and/or occupancy), comparisons of time averaged RSSI related to analogous thresholds, frequency analysis of variations in RSSI, and other such techniques as would be apparent to one of skill in the art.

In one example, the plots 950-951 and 955-962 of FIG. 9B include RSSI measurements that do not include perturbations from presence or motion of humans. These RSSI measurements may be similar to the baseline condition as illustrated in FIG. 5A. The plot 952 include perturbations likely caused by at least one human passing between sensor pairs or sensor and hub pairs.

In one example, for plot 952, a first portion 953 and a third portion 954 of the RSSI signal include values that are similar to the RSSI values during a baseline condition (e.g., plot 505). A second portion 954 includes values that are statistically lower than the first portion. Different signatures for baseline conditions and other conditions can be determined and then used to match with signatures of RSSI values. At least one human likely passes between the node 923 and another node (e.g., 924, 925, hub 920) pairing during the second portion 954.

This information can facilitate appropriate actions, such as controlling the operation of a home security system, controlling the operation of lighting, heating or cooling, or dispatching an autonomous cleaning robot. For example, information regarding regions of the home where significant activity occurred can be used to cause a cleaning robot to prioritize cleaning of those areas. As another example, motion detection can be used to cause a cleaning robot to de-prioritize cleaning a particular room so as to avoid inconveniencing occupants of the room present at that time. FIG. 8 shows an example of a robot having a path 870 in which the robot prioritizes cleaning of an area (e.g., 813, 815) with high detected occupancy in accordance with one embodiment based on cumulative occupancy estimations using RSSI. FIG. 9B shows an example of a robot having a path 970 in which the robot de-prioritizes cleaning of an area (e.g., room 911) with present occupants so as not to inconvenience them. The robot cleans other areas that do not have occupants.

Figure 10:
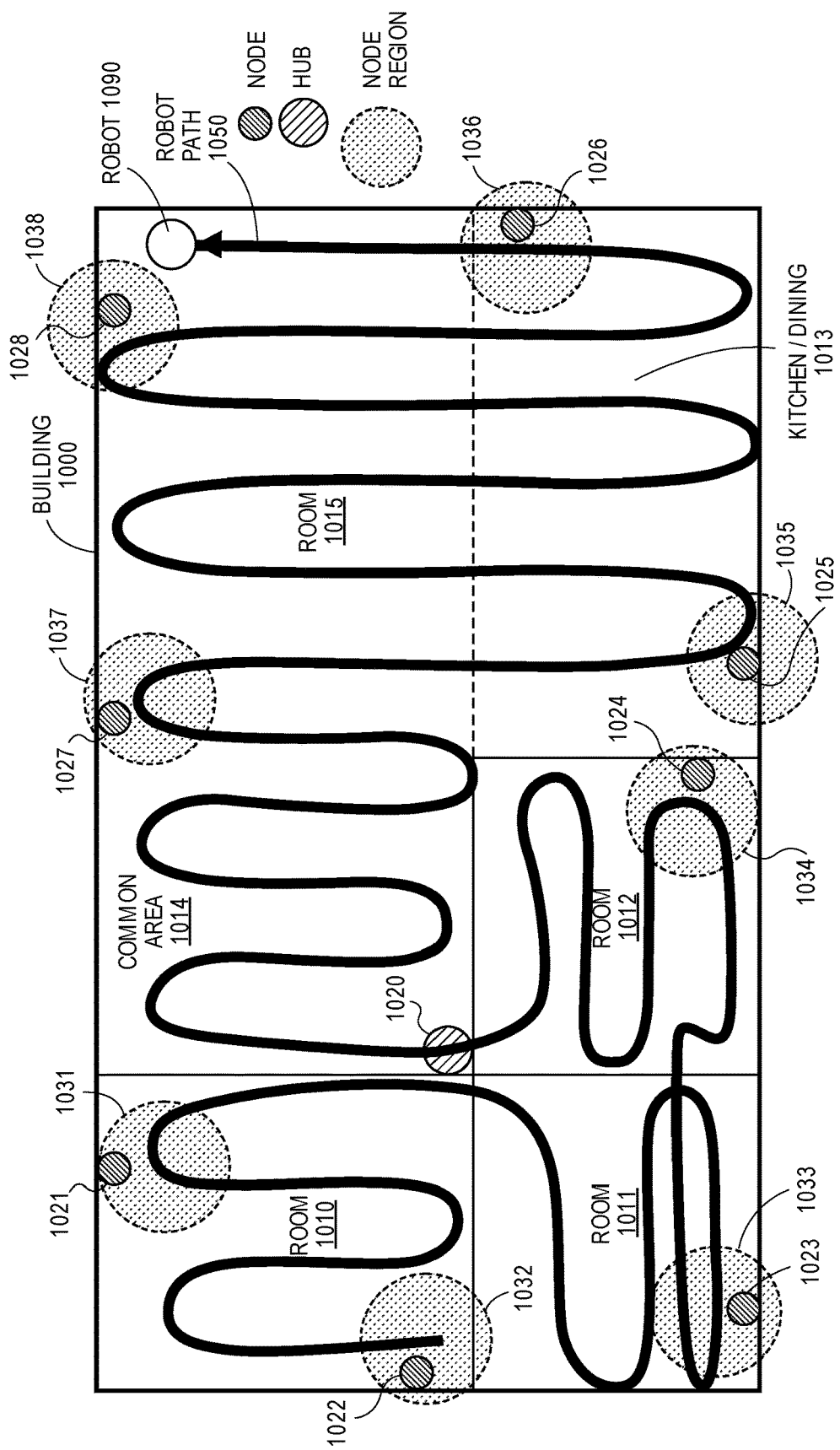
FIG. 10 illustrates a pattern followed by a cleaning robot in a sample building (e.g., house) in accordance with one embodiment.

RSSI measurements can also be used for relative positioning. This may be used, for example, to guide an indoor robot, drone, or other such device moving within an indoor environment. Generally, RSSI signal is strongest when the two communicating devices are closest (with some exceptions for situations where there may be interfering signals or where multipath signals are possible). As an example, this can be utilized to identify areas of interest for a cleaning robot without requiring knowledge of absolute node location. In the sample building (e.g., house) illustrated in FIGS. 7, 8, 9A, and 9B a cleaning robot may follow a cleaning pattern as shown in FIG. 10 in accordance with one embodiment. Building 1000 includes rooms 1010-1012, kitchen/dining area 1013, room 1015, and common area 1014. During a path 1050, the robot 1090 will come close to most or all of the nodes 1020-1028 and hub 1020 and will likely pass through associated node regions 1031-1038. If the robot 1090 is equipped with an RF receiver and can act as a RF device, then RSSI measurements can be performed between the robot and all the nodes. As it approaches individual nodes, the RSSI values associated with that node will increase. Using this, the robot can determine where the nodes are located relative to its path. If the robot has mapping or path memorization capabilities, then it can navigate itself to any node of interest. Once the robot has located the nodes relative to its own house map or path history, it can be automatically dispatched to any node area. This can be combined with RSSI measurements of presence/activity as discussed herein. However, in this manner the absolute position of the nodes in relation to the house map is not necessary.

Figure 11:
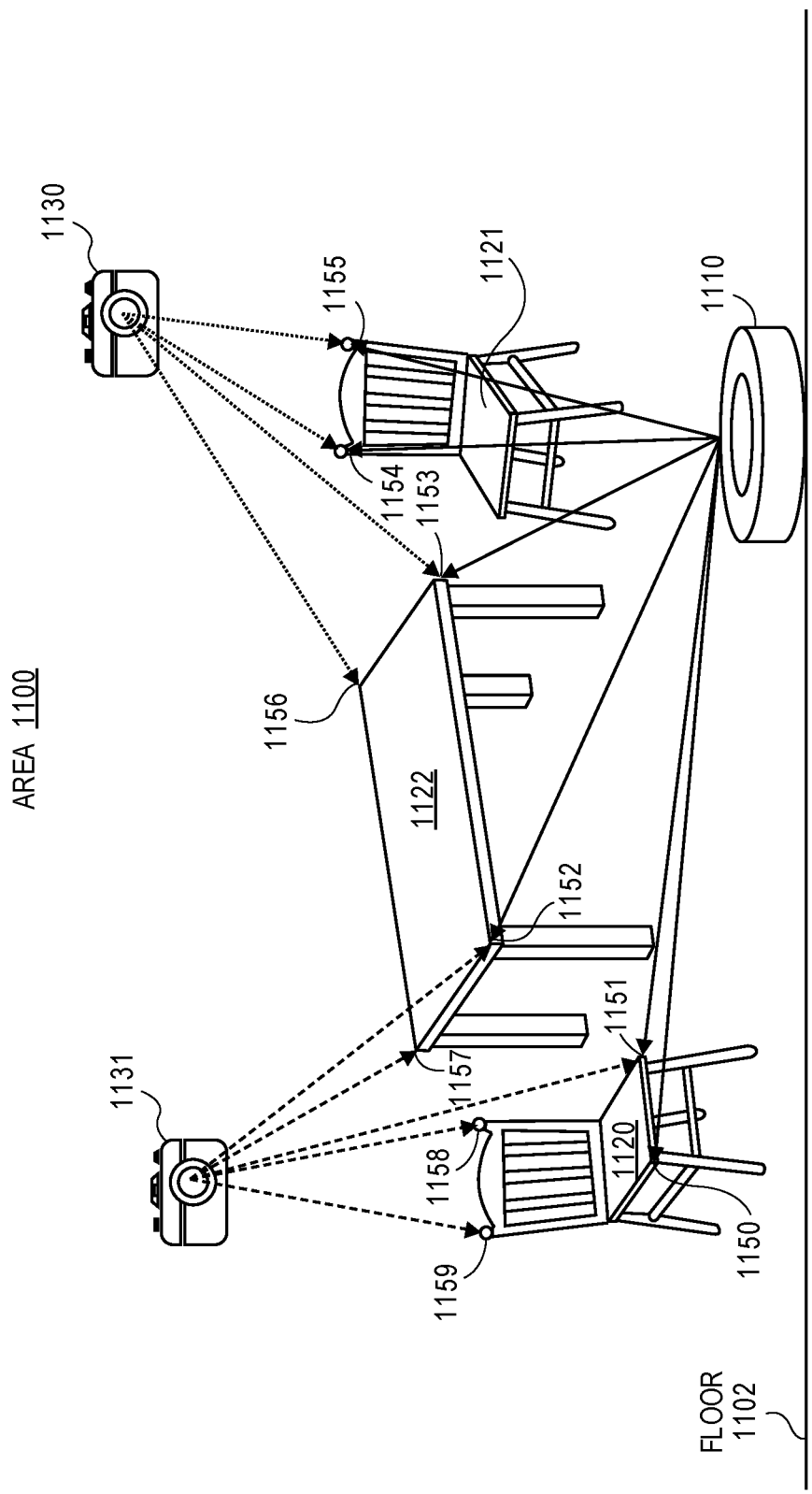
FIG. 11 illustrates combining images from multiple viewing angles of sensor nodes with images taken from a floor-level robot to provide a better representation of the environment in accordance with one embodiment.

The techniques herein may also exploit image-based mapping techniques. Such techniques have already been deployed in some indoor robots such as the iRobot 900 series. Current implementations of image based areal mapping by a moving robot rely on images taken by the robot as it moves though the environment. This is the basis for image based simultaneous localization and mapping (SLAM). In an example of a cleaning robot, it captures images as it moves through its environment and analyzes those images to determine its location within the environment. Image information can be combined with other sensory data from the robot (e.g., acceleration, direction, etc.) for better mapping. However, the imaging data is limited by the vantage point of the robot, which is usually floor-level. Overall mapping may be improved by introducing additional images of the environment from different vantage points. For example, a home monitoring and/or security system may include one or more image capturing device (e.g., camera, sensor, etc.) per room or area of the house. These are often mounted a certain distance (e.g., 4-7 ft) above or from the floor. Combining images from such viewing angles with images taken from the floor-level robot can provide a better representation of the environment. This is schematically illustrated in FIG. 11 in accordance with one embodiment. An area 1100 includes a floor 1102, a robot 1110, chairs 1120-1121, a table 1122, and image capturing devices 1130-1131. In this example, the robot 1110 captures points 1150-1155, image capturing device 1130 captures points 1153-1156, and image capturing device 1131 captures points 1151, 1152, and 1157-1159.

The accuracy of the image-based mapping can be augmented and/or improved using localization provided by the wireless network. In one embodiment, the robot can capture images of the sensors and can determine the robot location based on localization information determined via the wireless network. In another embodiment, the robot and/or the sensor nodes can be equipped with optical emitters and detectors such that the robot and/or sensor nodes detect optical emissions from one or another to identify proximity; this can then be combined with network-provided localization information to augment mapping accuracy.

Additionally, the robot can request an image of a room while it is moving. The image can be analyzed to identify for the robot's presence. This, combined with known locations of image capturing devices (e.g., cameras), can be used to further improve mapping by the robot or the camera system. Subsequently, the robot can request an image within itself in the field of view of the image capturing device. Such an image can be used to improved localization accuracy by the robot. For example, if a robot identifies two objects in its field of view (such as a chair and a table), the image capturing device can also capture an image of the robot and the objects of interest within the same field of view. Consequently, the relative position of the robot to the objects can be calculated.

Figure 12:
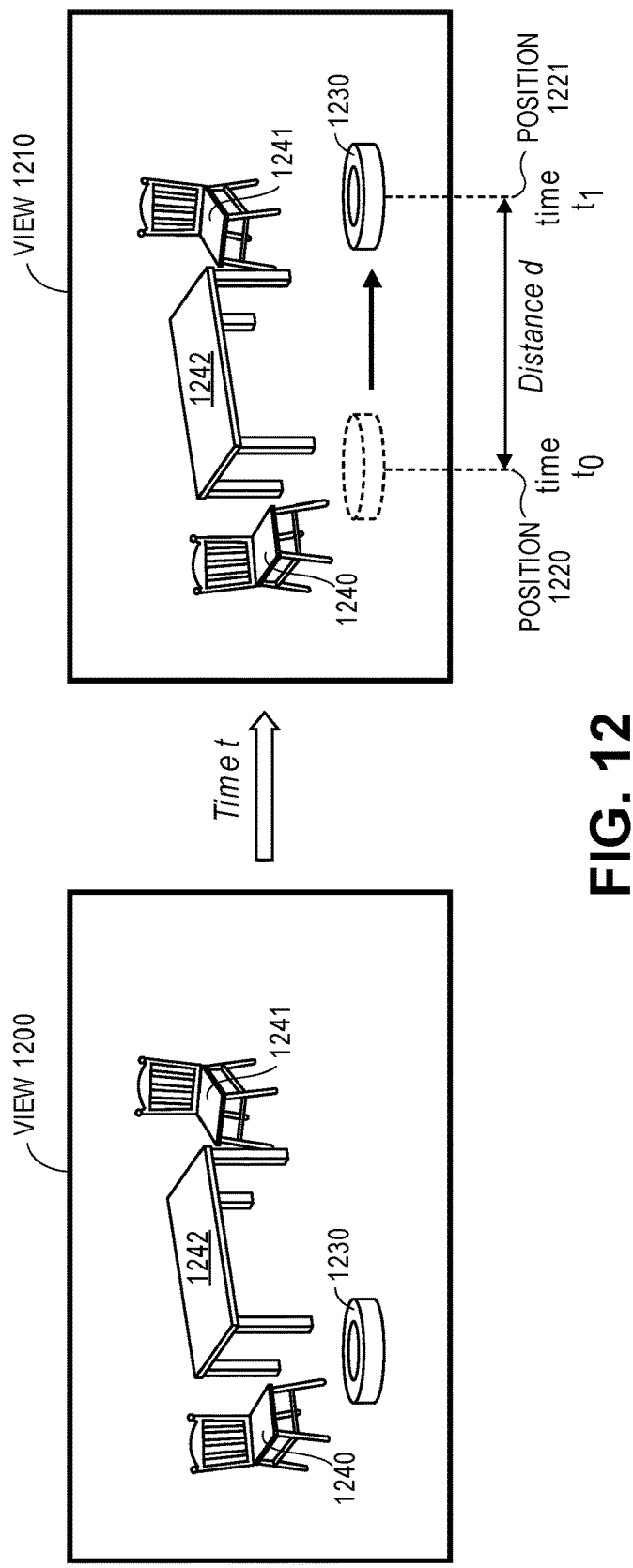
FIG. 12 illustrates capturing images of views 1200 and 1210 at a known time apart in accordance with one embodiment.

Furthermore, if the position of the image capturing devices (e.g., cameras) is known, more information can be obtained from images of the robot as it moves through the field of view. As an example, the robot can move at a known, constant speed. If two images of views 1200 and 1210 are taken a known time apart as illustrated in FIG. 12, then that time information can be combined with robot speed and distance d traveled within the field of view to calculate relative distance of the camera to the robot and distances of other objects within the field of view, as shown in FIG. 12. In one example, a first view 1200 is captured at a time t0 and a second view 1210 is captured at a time t1. Each view includes chairs 1240-1241 and table 1242.

Capturing images of the robot (or another object) as it moves through the field of view of a single or multiple cameras can also improve localization of the cameras. In a case of a moving object visible by two cameras, the relative position change in the field of view of different cameras may be used to estimate positions of the cameras relative to each other. Additionally, if the cleaning robot generates its own map of the environment, then the robot position within its own map can be used in conjunction with its estimated position within the camera localization map for better overall environment mapping.

Figure 13:
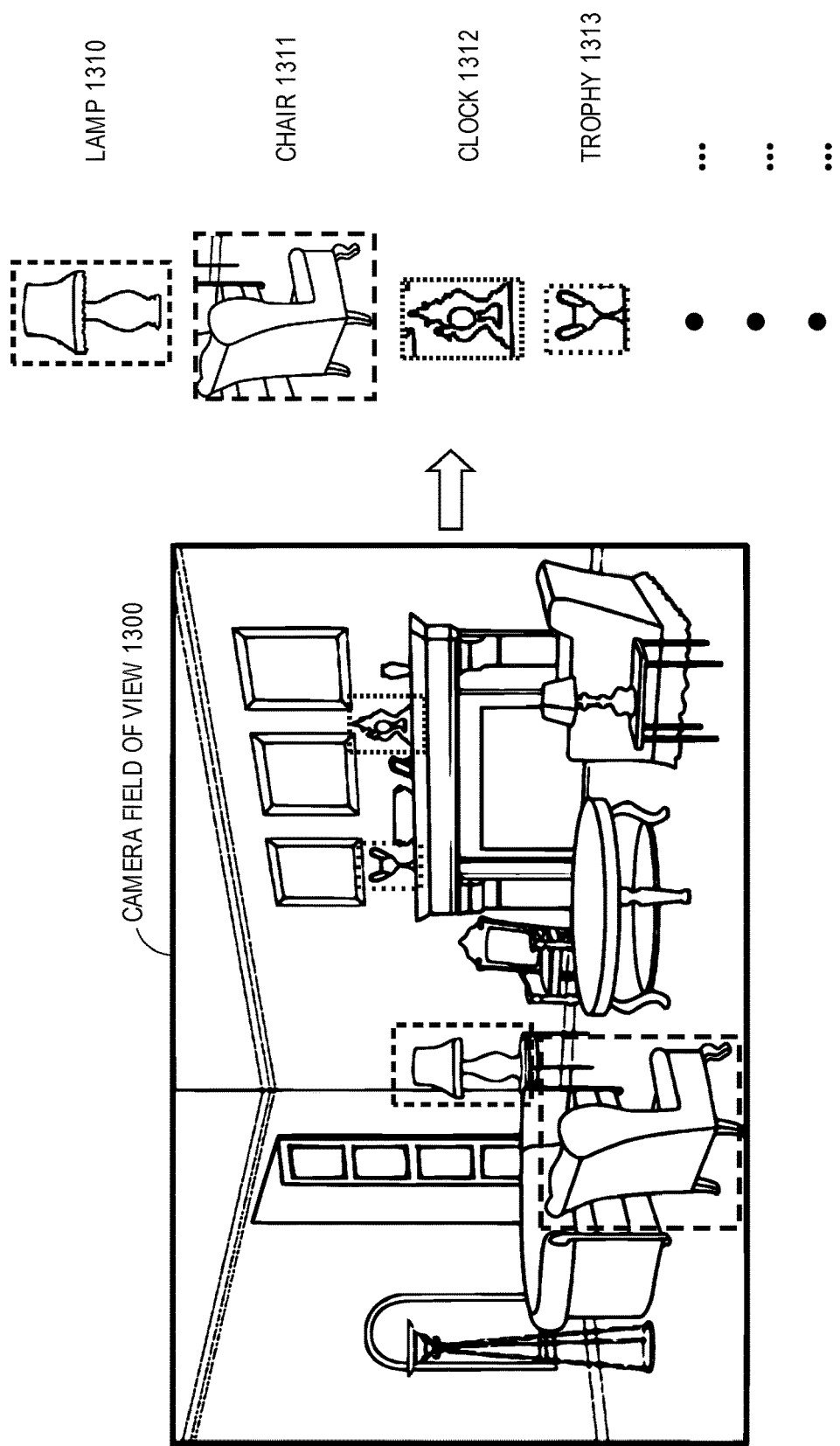
FIG. 13 illustrates a robot that can be used to track assets in an indoor environment as shown in view 1300 in accordance with one embodiment.

The combined data and action available from the sensor network and the robot can be used to augment various indoor functions. For example, the robot can be used to track assets in an indoor environment, as shown in view 1300 of FIG. 13 in accordance with one embodiment. An image capturing device (e.g., camera) of a robot has a field of view 1300. In one embodiment, this can be related to location provided by the SLAM and/or the wireless network. The robot can communication asset location, movement, or absence to the wireless network. The assets in the view 1300 include a lamp 1310, a chair 1311, a clock 1312, a trophy 1313, etc. This information may be used, for example, to provide improved home security.

Figure 14A:
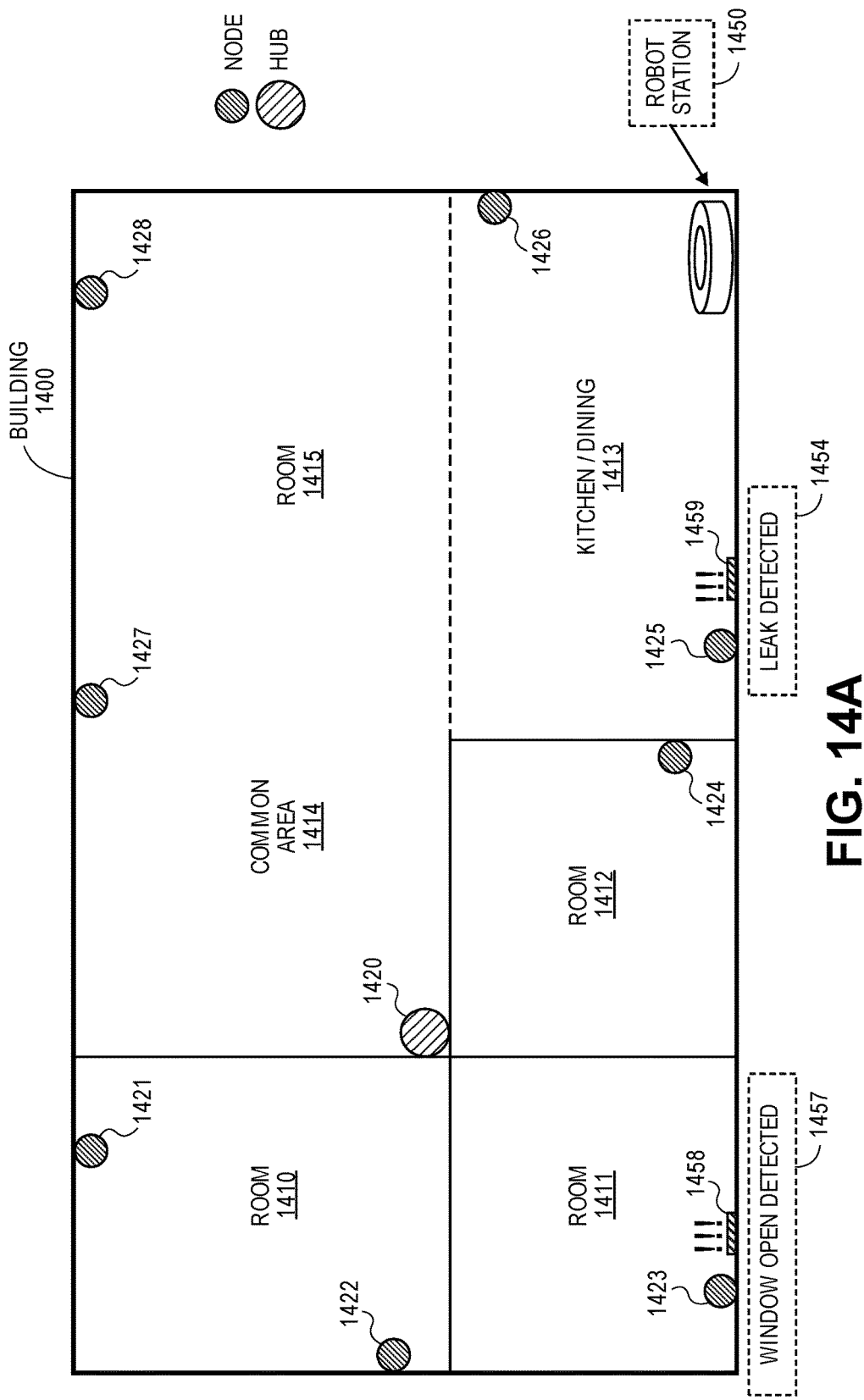
FIGS. 14A and 14B show how a robot may be used to confirm an event (e.g., a window is open, a water leak is detected, etc.) within a building or indoor environment in accordance with one embodiment.
Figure 14B:
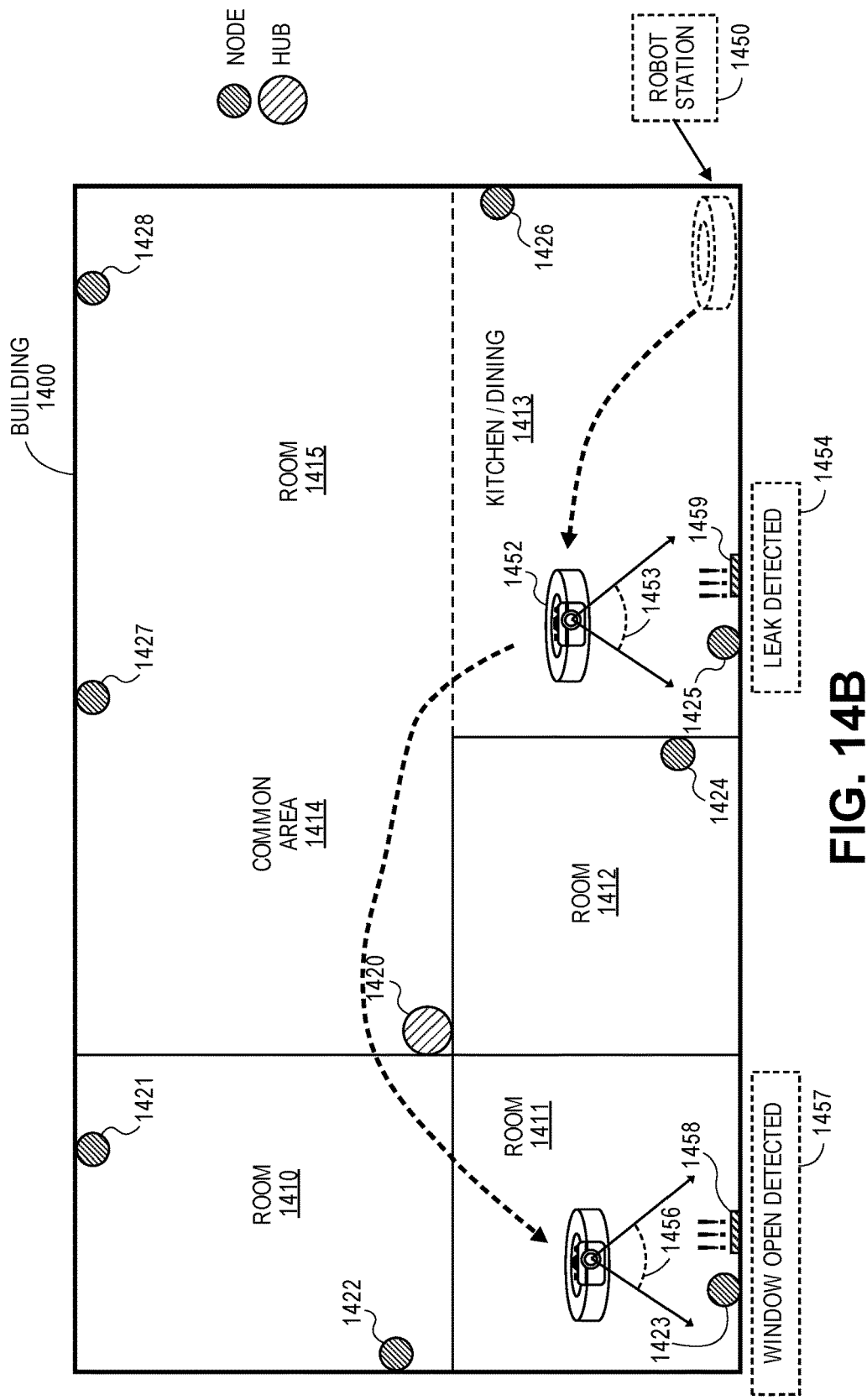

In another embodiment, the robot may be used in conjunction with the wireless network to provide verification of indoor conditions. FIGS. 14A and 14B show how a robot may be used to confirm an event (e.g., a window is open, a water leak is detected, etc.) within a building or indoor environment in accordance with one embodiment. In this example, the nodes 1421-1428 can be communicating with the hub 1420 and amongst each other in the different rooms including rooms 1421-1423 (e.g., bedroom, office, storage, etc.), a kitchen/dining area 1413, a common area 1414, and a room 1415 (e.g., living room, open area).

The opening of a window in the room 1411 may have been detected using a sensor (e.g., sensor 1423, an open/close sensor 1458, etc.) that is located in the room 1411 of a wireless network. The sensing of a window in an open condition when it is not expected to be open can cause the detecting sensor or hub to cause an open window event 1457. In one example, the detecting sensor sends a communication to the hub that indicates the detection of the open window and the hub then generates the open window event.

In another example, a leak may have been detected in proximity to kitchen/dining area 1413 using a sensor (e.g., sensor 1425, leakage and/or moisture detector 1459 of the wireless network, etc.) that is located in the area 1413 of a wireless network. The sensing of leakage or moisture can cause the detecting sensor, detector, or hub to cause a leakage/moisture event 1454. In one example, the detecting sensor or detector sends a communication to the hub that indicates the detection of the leak/moisture and the hub then generates the leak/moisture event.

A robot 1452 having a robot station 1450 for charging of the robot and other robotic operations can confirm various types of events (e.g., event 1457, event 1454, etc.). The robot 1452 can receive a communication from the hub 1420 or any sensor of the wireless sensor network. The communication can indicate an event detection. In response to receiving the event detection communication, the robot can be positioned in the area 1413 to have a view 1453. The robot 1452 can capture one or more images or video to confirm the leak/moisture detection event 1454. In another example, the robot 1452 having received an open window detection communication from the hub or sensors, can be positioned in the room 1411 to have a view 1456. The robot 1452 can capture one or more images or video to confirm the open window event 1457.

Figures 15A, 15B:
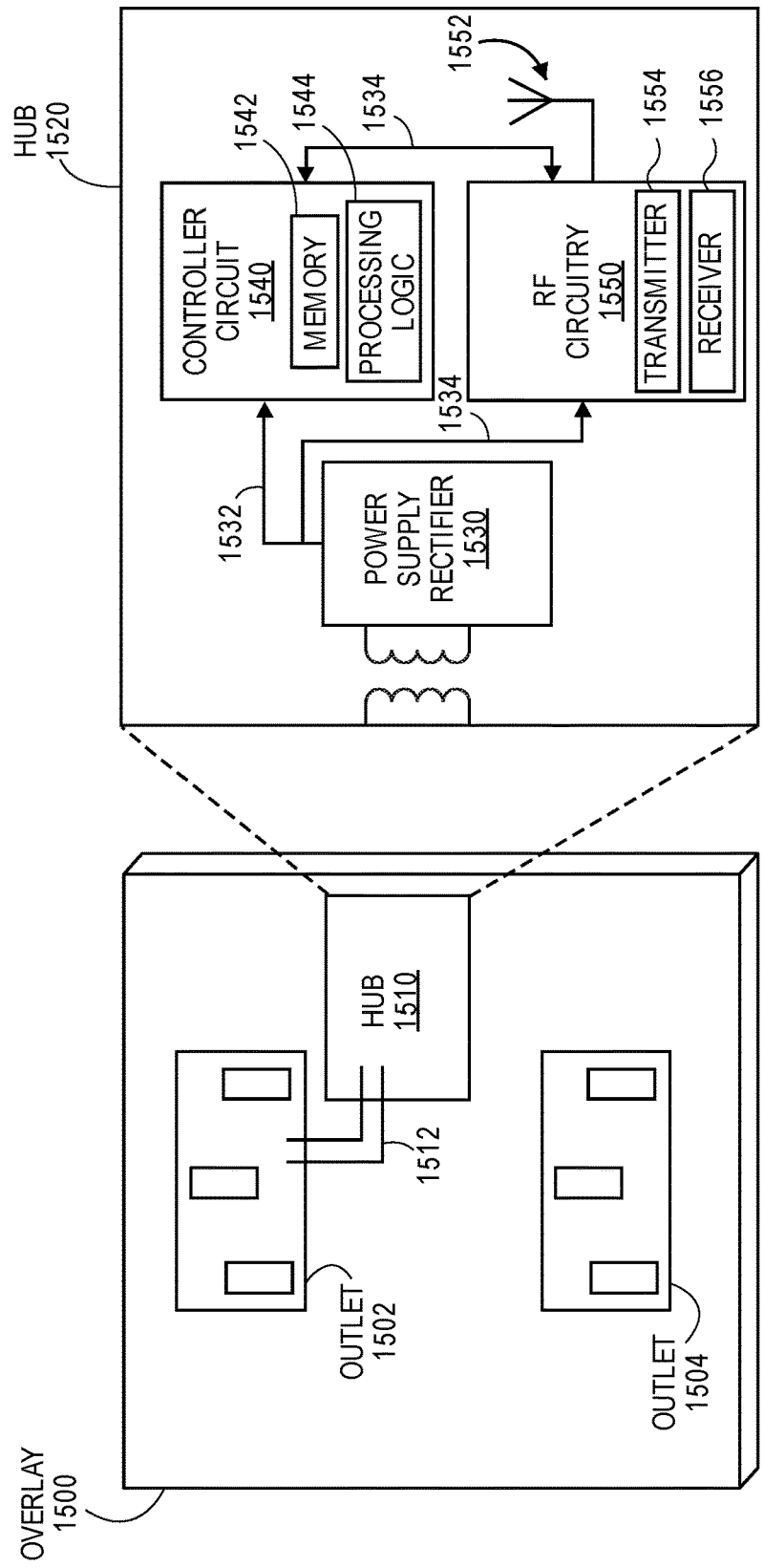
FIG. 15A shows an exemplary embodiment of a hub implemented as an overlay 1500 for an electrical power outlet in accordance with one embodiment.
FIG. 15B shows an exemplary embodiment of an exploded view of a block diagram of a hub 1520 implemented as an overlay for an electrical power outlet in accordance with one embodiment.

The hubs may be physically implemented in numerous ways in accordance with embodiments of the invention. FIG. 15A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 15B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub (e.g., forming and monitoring the wireless asymmetrical network, localization, determining occupancy and motion, event identification and verification, guiding robot operation, etc.) as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 16B:
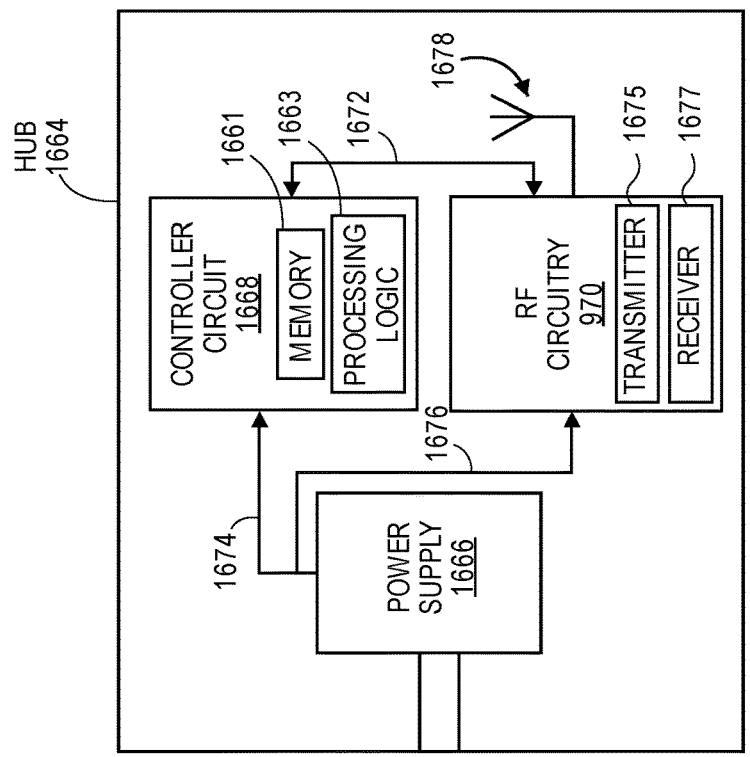
FIG. 16B shows an exemplary embodiment of a block diagram of a hub 1664 implemented as a card for deployment in a computer system, appliance, or communication hub in accordance with one embodiment.
Figure 16A:
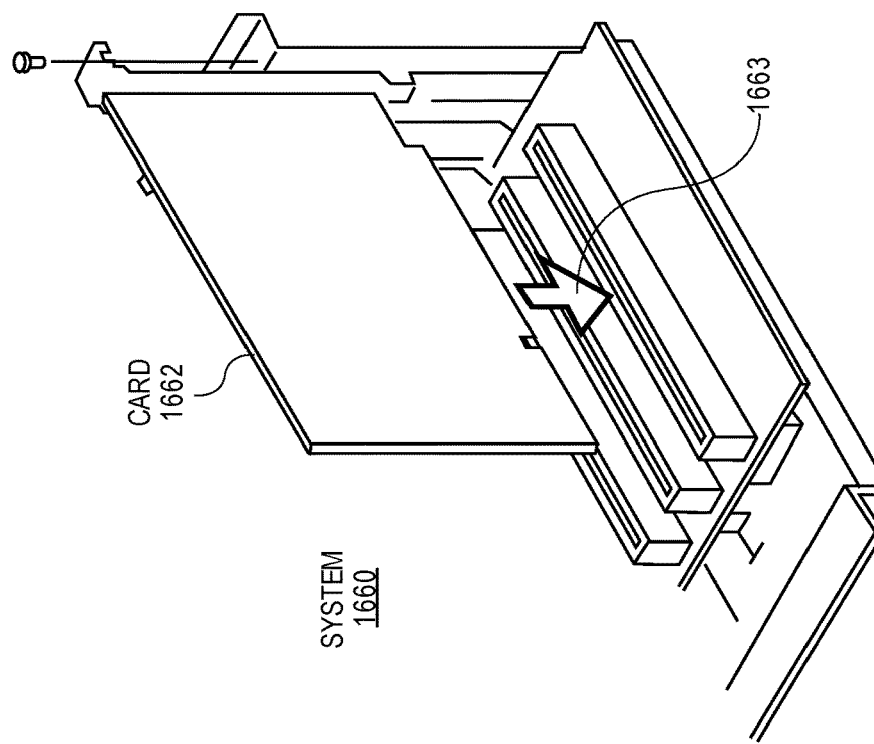
FIG. 16A shows an exemplary embodiment of a hub implemented as a card for deployment in a computer system, appliance, or communication hub in accordance with one embodiment.

FIG. 16A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 16B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and communicating within the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

Figure 16D:
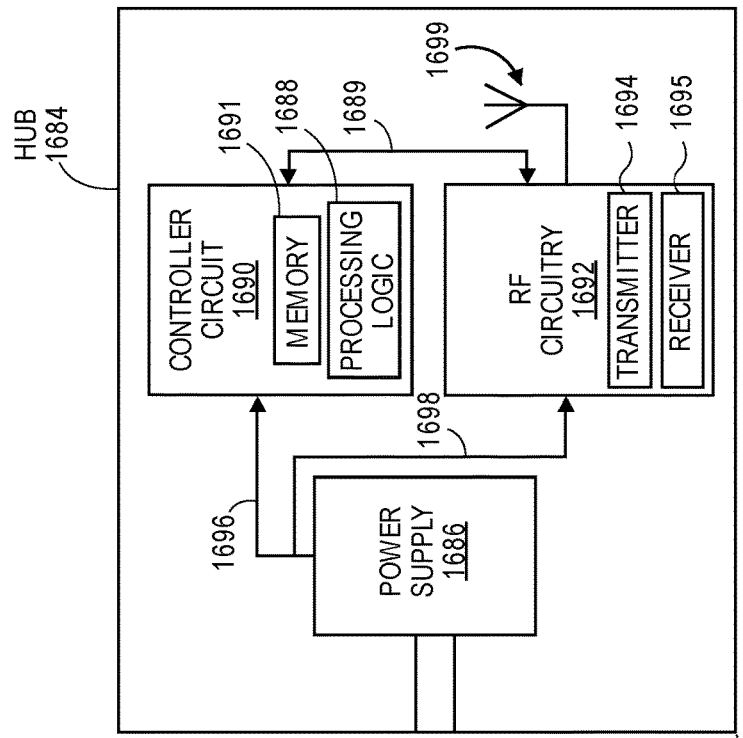
FIG. 16D shows an exemplary embodiment of an exploded view of a block diagram of a hub 1684 imple
Figure 16C:
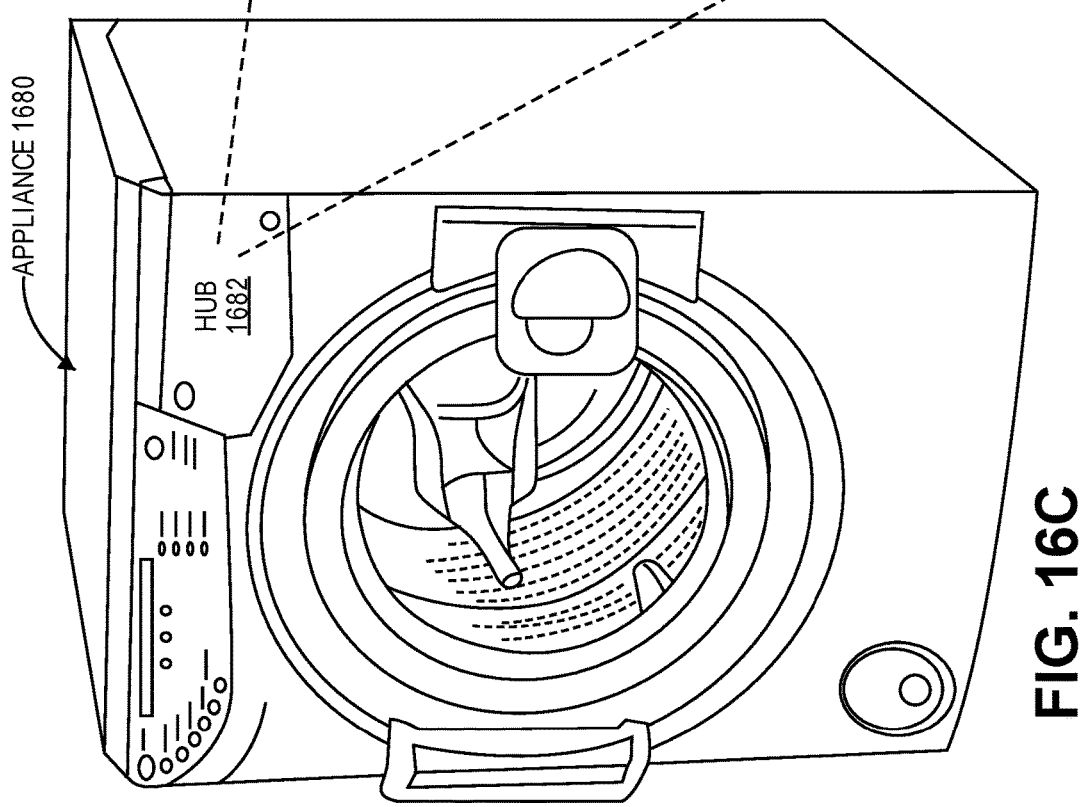
FIG. 16C shows an exemplary embodiment of a hub implemented within an appliance (e.g., smart washing machine, smart refrigerator, smart thermostat, other smart appliances, etc.) in accordance with one embodiment.

FIG. 16C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 16D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuitry 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture. The processing logic (e.g., one or more processing units) is configured to execute instructions to negotiate a timing of at least one periodic guaranteed time slot for the plurality of sensor nodes to be capable of periodic bi-directional communications with the apparatus and to determine at least one of motion and occupancy within the wireless network architecture based on a power level of the received RF communications.

In one example, the one or more processing units of the hub are configured to execute instructions to determine at least one of motion and occupancy within the wireless network architecture based on determining motion of humans or pets and occupancy of humans or pets within an indoor environment that is associated with the wireless network architecture.

In one example, the one or more processing units of the hub are configured to execute instructions to determine a power level of received RF communications including identifying a first set of RF communications having a baseline power level to indicate a baseline condition and also identifying a second set of RF communications having a threshold power level to indicate a motion condition or an occupancy condition within the wireless asymmetric network.

In one example, the power level comprises received signal strength indicator (RSSI) information including baseline values of RSSI for the baseline level to be compared with threshold values of RSSI for the threshold level to determine the motion condition or the occupancy condition.

In one example, the plurality of sensor nodes includes a first group of sensor nodes and a second group of sensor nodes. A transmitter of at least one of the first group of sensor nodes is configured to be operable during a first periodic guaranteed time slot and a transmitter of at least one of the second group of sensor nodes is configured to be operable during the first or a second periodic guaranteed time slot.

Various batteries could be used in the wireless sensor nodes, including lithium-based chemistries such as Lithium Ion, Lithium Thionyl Chloride, Lithium Manganese Oxide, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 17:
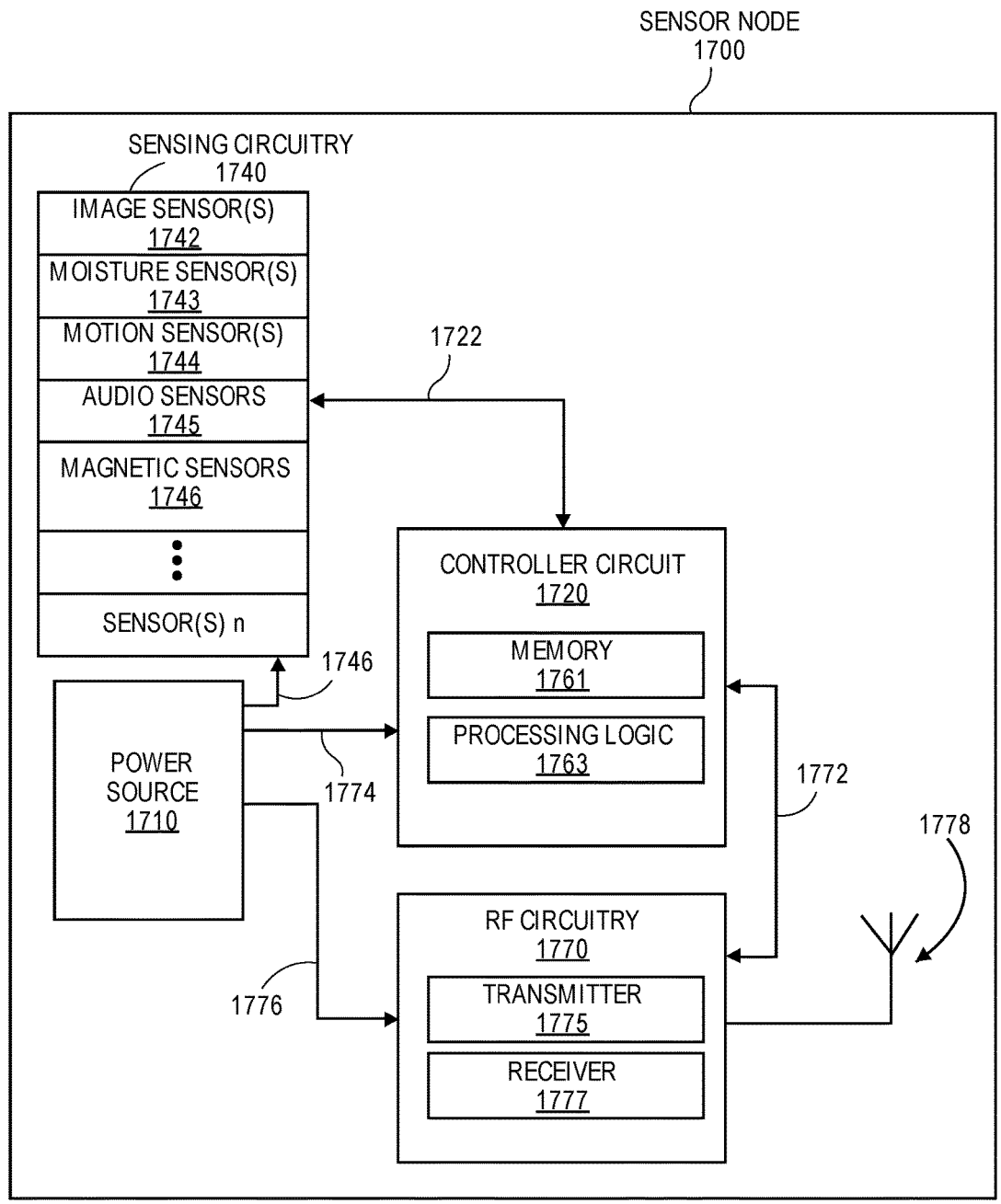
- FIG. 17 illustrates a block diagram of a sensor node in accordance with one embodiment.

FIG. 17 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node (e.g., forming and monitoring the wireless asymmetrical network, localization, determining occupancy and motion, event identification and verification, guiding robot operation, etc.) as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

Figure 18:
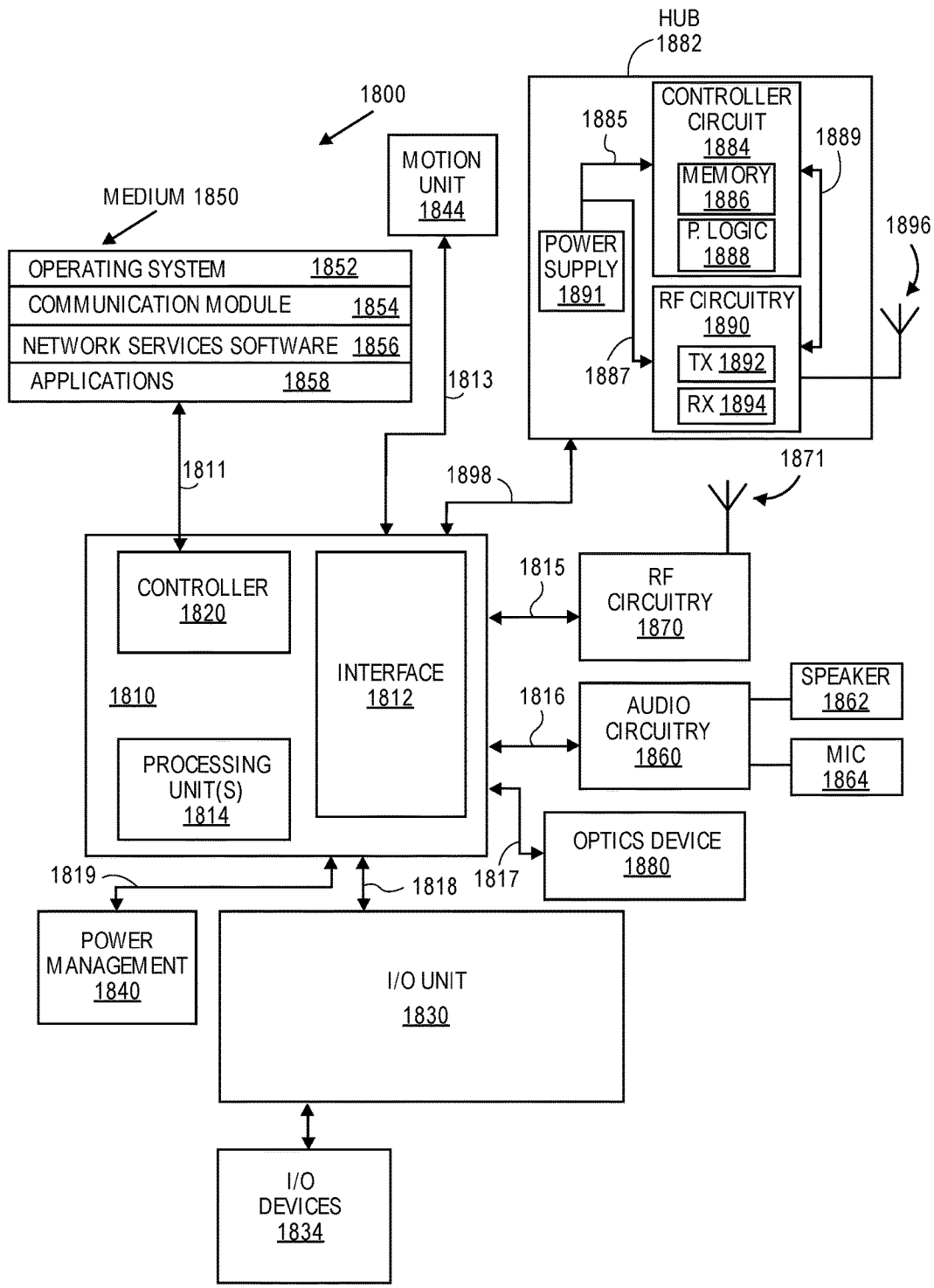
FIG. 18 illustrates a block diagram of a system or appliance 1800 having a hub in accordance with one embodiment.

FIG. 18 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub (e.g., forming and monitoring the wireless asymmetrical network, localization, determining occupancy and motion, event identification and verification, guiding robot operation, etc.) as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, robot applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for providing a wireless asymmetric network, comprising:
a hub having one or more processing units and at least one antenna for transmitting and receiving radio frequency (RF) communications in the wireless asymmetric network; and
a plurality of sensor nodes each having a wireless device with a transmitter and a receiver to enable bi-directional RF communications with the hub in the wireless asymmetric network, wherein the one or more processing units of the hub are configured to execute instructions to determine for a first time period a first power level including received signal strength indicator (RSSI) information to determine time averaged RSSI of received RF communications between two sensor nodes of the plurality of sensor nodes or between a sensor node and the hub, to determine whether the first power level is a baseline power level to indicate a baseline condition with no occupancy or motion for the first time period, to determine for a second time period a second power level including RSSI information to determine time averaged RSSI of received RF communications between two sensor nodes of the plurality of sensor nodes or between a sensor node and the hub, to determine whether the second power level is a first threshold power level or a second threshold power level to indicate at least one of motion of humans or pets and occupancy of humans or pets for the second time period within the wireless asymmetric network, wherein the first threshold power level that is below the baseline power level indicates motion of a human or pet and the second threshold power level that is below the first threshold power level indicates occupancy of a human or pet between sensor node pairs or positioned between a sensor node and the hub.

2. The system of claim 1, wherein the one or more processing units of the hub are configured to execute instructions to determine at least one of motion and occupancy within the wireless asymmetric network based on determining motion of humans or pets and occupancy of humans or pets within an indoor environment that is associated with the wireless asymmetric network.

3. The system of claim 1, wherein the first threshold power level that is below the baseline power level indicates motion of a human or pet, a second threshold power level that is below the first threshold power level indicates occupancy of a smaller human or pet, and a third threshold power level that is above the baseline power level indicates when a reflective surface or other disturbance is positioned between sensor node pairs or positioned between a sensor node and the hub.

4. The system of claim 1, wherein the one or more processing units of the hub are configured to execute instructions to determine location information for the plurality of sensor nodes based on receiving RF communications from the plurality of sensor nodes.

5. The system of claim 1, wherein the plurality of sensors have a threshold density in spacing from each other in order to determine a baseline power level and a threshold power level.

6. The system of claim 1, wherein the first hub is powered by a mains electrical source and the plurality of sensor nodes are each powered by a battery source to form the wireless asymmetric network.

7. The system of claim 1, wherein an asymmetry of available power for the hub and the plurality of sensor nodes is exploited to enhance battery life and communication range in a wireless sensor network of the plurality of sensor nodes based on low-duty cycle networking to reduce transmission-related energy consumption of the plurality of sensor nodes in the wireless sensor network.

8. An apparatus, comprising:
a memory for storing instructions;
one or more processing units to execute instructions for monitoring a plurality of sensor nodes in a wireless network architecture; and
radio frequency (RF) circuitry to transmit RF communications to and receive RF communications from the plurality of sensor nodes each having a wireless device with a transmitter and a receiver to enable bi-directional communications with the RF circuitry of the apparatus in the wireless network architecture, wherein the one or more processing units of the apparatus are configured to execute instructions to negotiate a timing of at least one periodic guaranteed time slot for the plurality of sensor nodes to be capable of periodic bi-directional communications with the apparatus, to determine for a first time period a first power level including received signal strength indicator (RSSI) information to determine time averaged RSSI of received RF communications between two sensor nodes of the plurality of sensor nodes or between a sensor node and the apparatus, to determine whether the first power level is a baseline power level to indicate a baseline condition with no occupancy or motion for the first time period, to determine for a second time period a second power level including RSSI information to determine time averaged RSSI of received RF communications between two sensor nodes of the plurality of sensor nodes or between a sensor node and the apparatus, to determine whether the second power level is a first threshold power level or a second threshold power level to indicate at least one of motion of humans or pets and occupancy of humans or pets for the second time period within the wireless asymmetric network, wherein the first threshold power level that is below the baseline power level indicates motion of a human or pet and the second threshold power level that is below the first threshold power level indicates occupancy of a human or pet between sensor node pairs or positioned between a sensor node and the apparatus.

9. The apparatus of claim 8, wherein the one or more processing units of the hub are configured to execute instructions to determine at least one of motion and occupancy within the wireless network architecture based on determining motion of humans or pets and occupancy of humans or pets within an indoor environment that is associated with the wireless network architecture.

10. The apparatus of claim 8, wherein the first threshold power level that is below the baseline power level indicates motion of a human or pet, a second threshold power level that is below the first threshold power level indicates occupancy of a smaller human or pet, and a third threshold power level that is above the baseline power level indicates when a reflective surface or other disturbance is positioned between sensor node pairs or positioned between a sensor node and the hub.

11. The apparatus of claim 10, wherein the power level comprises received signal strength indicator (RSSI) information including baseline values of RSSI for the baseline level to be compared with threshold values of RSSI for the threshold level to determine the motion condition or the occupancy condition.

12. The apparatus of claim 8, wherein the plurality of sensor nodes includes a first group of sensor nodes and a second group of sensor nodes, wherein a transmitter of at least one of the first group of sensor nodes is configured to be operable during a first periodic guaranteed time slot and a transmitter of at least one of the second group of sensor nodes is configured to be operable during the first or a second periodic guaranteed time slot.

13. A method for determining motion or occupancy in a wireless network architecture, comprising:
    transmitting, with radio frequency (RF) circuitry including at least one antenna of a hub, RF communications to a plurality of sensor nodes in the wireless network architecture;
    receiving, with the RF circuitry including at least one antenna of the hub, RF communications from the plurality of sensor nodes each having a wireless device with a transmitter and a receiver to enable bi-directional RF communications with the RF circuitry of the hub in the wireless network architecture;
    determining for a first time period, with one or more processing units of the hub or sensor nodes, a first power level including received signal strength indicator (RSSI) information to determine time averaged RSSI for received RF communications between two sensor nodes of the plurality of sensor nodes or between a sensor node and the hub;
    determining whether the first power level is a baseline power level to indicate a baseline condition with no occupancy or motion for the first time period;
    determining for a second time period a second power level including RSSI information to determine time averaged RSSI of received RF communications between two sensor nodes of the plurality of sensor nodes or between a sensor node and the hub; and
    determining whether the second power level is a first threshold power level or a second threshold power level to indicate at least one of motion of humans or pets and occupancy of humans or pets for the second time period within an indoor environment that is associated with the wireless network architecture, wherein the first threshold power level that is below the baseline power level indicates motion of a human or pet and the second threshold power level that is below the first threshold power level indicates occupancy of a human or pet between sensor node pairs or positioned between a sensor node and the hub.

14. The method of claim 13, wherein the first threshold power level that is below the baseline power level indicates motion of a human or pet, a second threshold power level that is further below the baseline power level indicates occupancy of a smaller human or pet, and a third threshold power level that is above the baseline power level indicates when a reflective surface or other disturbance is positioned between sensor node pairs.

15. The method of claim 14, wherein the power level information comprises received signal strength indicator (RSSI) information including instantaneous values of RSSI to be compared with threshold values to determine the motion condition or the occupancy condition.

16. The method of claim 14, wherein the power level information comprises received signal strength indicator (RSSI) information to be used to determine at least one of time averaged RSSI and frequency analysis of variations of RSSI to determine the motion condition or the occupancy condition.

17. The method of claim 14, further comprising:
    determining a path to guide movement of a robot within the indoor environment based on the determination of the occupancy condition which indicates an occupancy within an area of the indoor environment.

18. The method of claim 13, further comprising:
    determining a position of a robot within the indoor environment based on the power level information for the received RF communications.

19. The method of claim 13, further comprising:
    capturing image data with a robot;
    capturing image data with at least one sensor of the plurality of sensors;
    determining a mapping of the robot within the indoor environment based on the image data of the robot, image data of the at least one sensor, and the power level information for the received RF communications.

20. The method of claim 13, further comprising:
    determining an event that is not considered normal within the indoor environment;
    generating at least one communication with the hub or at least one sensor to indicate detection of the event;
    sending the at least one communication to the robot;
    activating the robot to investigate the event by moving to a position in proximity to the detected event;
    capturing images of a region associated with the event; and
    determining whether the event has occurred based on the images captured by the robot.

* * * * *